(12) United States Patent
Deperraz et al.

(10) Patent No.: US 11,306,825 B2
(45) Date of Patent: Apr. 19, 2022

(54) VALVE ASSEMBLY

(71) Applicant: FAS MEDIC S.A., Palezieux (CH)

(72) Inventors: Nicolas Deperraz, Bons en Chablais (FR); Vincent Tanari, Satigny (CH); Pauline Labory, St Jean de Gonville (FR); Sebastien Matthey, Autigny (CH); Eric Pernette, Saint-Genis (FR)

(73) Assignee: FAS MEDIC S.A., Palézieux (CH)

( * ) Notice: Subject to any disclaimer, the term of this patent is extended or adjusted under 35 U.S.C. 154(b) by 0 days.

(21) Appl. No.: 17/056,128

(22) PCT Filed: May 17, 2019

(86) PCT No.: PCT/EP2019/062894
§ 371 (c)(1),
(2) Date: Nov. 17, 2020

(87) PCT Pub. No.: WO2019/219957
PCT Pub. Date: Nov. 21, 2019

(65) Prior Publication Data
US 2021/0215261 A1   Jul. 15, 2021

(30) Foreign Application Priority Data
May 18, 2018 (EP) ..................................... 18173331

(51) Int. Cl.
*F16K 1/44* (2006.01)
*F16K 31/06* (2006.01)
(Continued)

(52) U.S. Cl.
CPC .............. *F16K 1/44* (2013.01); *F16K 11/044* (2013.01); *F16K 31/0655* (2013.01);
(Continued)

(58) Field of Classification Search
CPC ............... F16K 39/022; F16K 31/0693; F16K 31/0675; F16K 31/0655; F16K 39/02;
(Continued)

(56) References Cited

U.S. PATENT DOCUMENTS 2,709,451 A * 5/1955 La Bour ................ F16K 39/022
137/625.35
3,219,063 A * 11/1965 Schumann ................ F16K 1/42
137/625.33
(Continued)

FOREIGN PATENT DOCUMENTS

DE         10319920 A1    5/2004
DE      102006006883 A1   8/2007

OTHER PUBLICATIONS

European Search Report dated Nov. 23, 2018 for Patent Application No. EP 18 17 3331.2.
(Continued)

*Primary Examiner* — Matthew W Jellett
*Assistant Examiner* — Christopher D Ballman
(74) *Attorney, Agent, or Firm* — Young Basile Hanlon & MacFarlane, P.C.

(57) ABSTRACT

A valve assembly having an inner and outer concentric valve seat. The inner valve seat is arranged radially inward of the outer valve seat to provide an annular opening therebetween. A movable plunger moves between a closed position and an open position to vary a flow restriction at the inner and outer valve seats and simultaneously seal the inner and outer valve seats in the closed position. An inner and outer valve member comprise the inner and outer valve seats and are separate components mounted in fixed relation to one another. The inner and outer valves seats are radially aligned to maintain concentricity of the inner valve seat relative to the outer valve seat and axially aligned to maintain axial alignment of the inner valve seat relative to the outer valve (Continued)

along an axis, wherein the axis is substantially orthogonal to a plane of the inner and outer valve seats.

22 Claims, 13 Drawing Sheets

(51) Int. Cl.
*F16K 39/02* (2006.01)
*F16K 11/044* (2006.01)
*F16K 1/36* (2006.01)
*F16K 31/08* (2006.01)

(52) U.S. Cl.
CPC ............... *F16K 39/02* (2013.01); *F16K 1/36* (2013.01); *F16K 31/0624* (2013.01); *F16K 31/0627* (2013.01); *F16K 31/0675* (2013.01); *F16K 31/0693* (2013.01); *F16K 31/082* (2013.01); *F16K 39/022* (2013.01)

(58) Field of Classification Search
CPC ...... F16K 31/082; F16K 1/36; F16K 31/0624; F16K 1/44
See application file for complete search history.

(56) References Cited

U.S. PATENT DOCUMENTS

| | | | | |
|---|---|---|---|---|
| 4,300,595 A * | 11/1981 | Mayer | ............... | F16K 1/34 |
| | | | | 137/625.33 |
| 4,383,234 A * | 5/1983 | Yatsushiro | ............ | F16K 31/082 |
| | | | | 335/230 |
| 4,514,710 A * | 4/1985 | Conrad | ............... | F16K 39/022 |
| | | | | 251/129.1 |
| 4,782,862 A * | 11/1988 | Nguyen | ............... | F16K 31/0693 |
| | | | | 137/630.14 |
| 4,953,825 A * | 9/1990 | Osumi | ............... | F16K 31/0658 |
| | | | | 251/129.07 |
| 5,265,643 A * | 11/1993 | Golestan | ............ | G05D 7/0133 |
| | | | | 137/504 |
| 5,398,724 A * | 3/1995 | Vars | ............... | F02M 21/0272 |
| | | | | 137/625.33 |
| 5,524,865 A | 6/1996 | Uchisawa et al. | | |
| 5,582,208 A | 12/1996 | Suzuki | | |
| 5,927,331 A * | 7/1999 | Suzuki | ............... | F16K 31/007 |
| | | | | 137/625.33 |
| 5,975,654 A * | 11/1999 | Zaviska | ............... | B60T 8/363 |
| | | | | 137/599.16 |
| 6,220,277 B1 * | 4/2001 | Blain | ............... | F16K 31/0693 |
| | | | | 137/271 |
| 6,357,677 B1 | 3/2002 | Ren et al. | | |
| 6,382,587 B1 * | 5/2002 | Rabe | ............... | F02D 9/12 |
| | | | | 251/318 |
| 6,526,951 B2 * | 3/2003 | Ishigaki | ............ | B60K 15/03504 |
| | | | | 123/519 |
| 6,570,820 B2 * | 5/2003 | Patel | ............... | F16K 31/0693 |
| | | | | 367/144 |
| 6,619,322 B1 | 9/2003 | Wojciechowski et al. | | |
| 6,682,316 B1 * | 1/2004 | Boke | ............... | B67D 7/36 |
| | | | | 251/30.04 |
| 6,832,748 B2 * | 12/2004 | Carroll, III | ......... | F16K 31/0693 |
| | | | | 251/129.07 |
| 6,871,803 B1 * | 3/2005 | Ohmi | ............... | H04W 74/006 |
| | | | | 239/596 |
| 6,920,895 B2 * | 7/2005 | Avis | ............... | F16K 17/30 |
| | | | | 137/462 |
| 7,077,378 B2 * | 7/2006 | Rampen | ............... | F16K 15/08 |
| | | | | 251/129.15 |
| 7,118,088 B2 * | 10/2006 | Hirota | ............... | F25B 41/31 |
| | | | | 251/129.19 |
| 7,140,386 B2 * | 11/2006 | Avis | ............... | F16K 17/30 |
| | | | | 137/504 |
| 7,219,690 B2 * | 5/2007 | McDonald | ............ | F16K 17/30 |
| | | | | 137/512.1 |
| 7,270,310 B2 * | 9/2007 | Takakura | ............... | F16K 24/04 |
| | | | | 251/30.04 |
| 7,591,281 B2 * | 9/2009 | Tsuge | ............... | F16K 41/10 |
| | | | | 137/495 |
| 7,857,282 B2 * | 12/2010 | Goossens | ............ | F16K 31/0655 |
| | | | | 251/129.07 |
| 8,186,377 B2 * | 5/2012 | Ishitoya | ............... | F16K 25/005 |
| | | | | 137/516.29 |
| 8,616,523 B2 * | 12/2013 | Duerr | ............... | F16K 1/12 |
| | | | | 251/129.15 |
| 9,285,054 B2 * | 3/2016 | Matsumoto | ............ | F16K 39/022 |
| 9,360,127 B2 * | 6/2016 | Helmsen | ............... | F16K 1/36 |
| 9,720,420 B2 * | 8/2017 | Uchida | ............... | F16K 31/0693 |
| 9,739,382 B2 * | 8/2017 | Laird | ............... | F16K 31/0624 |
| 9,803,635 B2 * | 10/2017 | Kato | ............... | F16K 1/32 |
| 9,897,221 B2 * | 2/2018 | Terashima | ......... | F02M 21/0266 |
| 9,914,353 B2 * | 3/2018 | Walter | ............... | F16K 31/06 |
| 10,161,395 B2 * | 12/2018 | Vadasz | ............... | E21B 43/12 |
| 10,253,682 B2 * | 4/2019 | Lenk | ............... | F16K 31/0655 |
| 10,641,397 B2 | 5/2020 | Bjerrehorn | | |
| 2005/0217734 A1 * | 10/2005 | Takakura | ............... | F16K 24/04 |
| | | | | 137/587 |
| 2011/0175004 A1 | 7/2011 | Duerr et al. | | |
| 2013/0112904 A1 | 5/2013 | Tanari | | |
| 2013/0205986 A1 | 8/2013 | Rampen et al. | | |
| 2015/0337972 A1 * | 11/2015 | Hayasaka | ............... | F16K 11/24 |
| | | | | 137/625.33 |
| 2016/0279376 A1 * | 9/2016 | Cewers | ............ | A61M 16/0858 |
| 2017/0130861 A1 * | 5/2017 | Deperraz | ............... | F16K 1/54 |
| 2018/0128382 A1 | 5/2018 | Bjerrehorn | | |

OTHER PUBLICATIONS

International Search Report dated Jun. 7, 2019 for PCT Patent Application No. PCT/EP2019/062894.

* cited by examiner

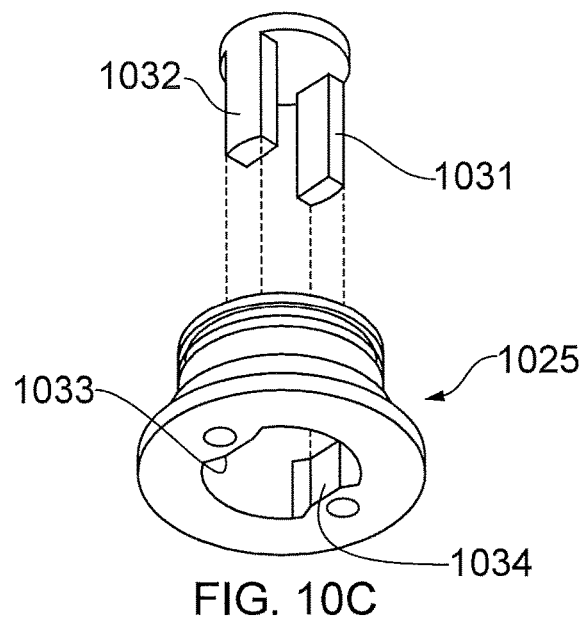
FIG. 10C
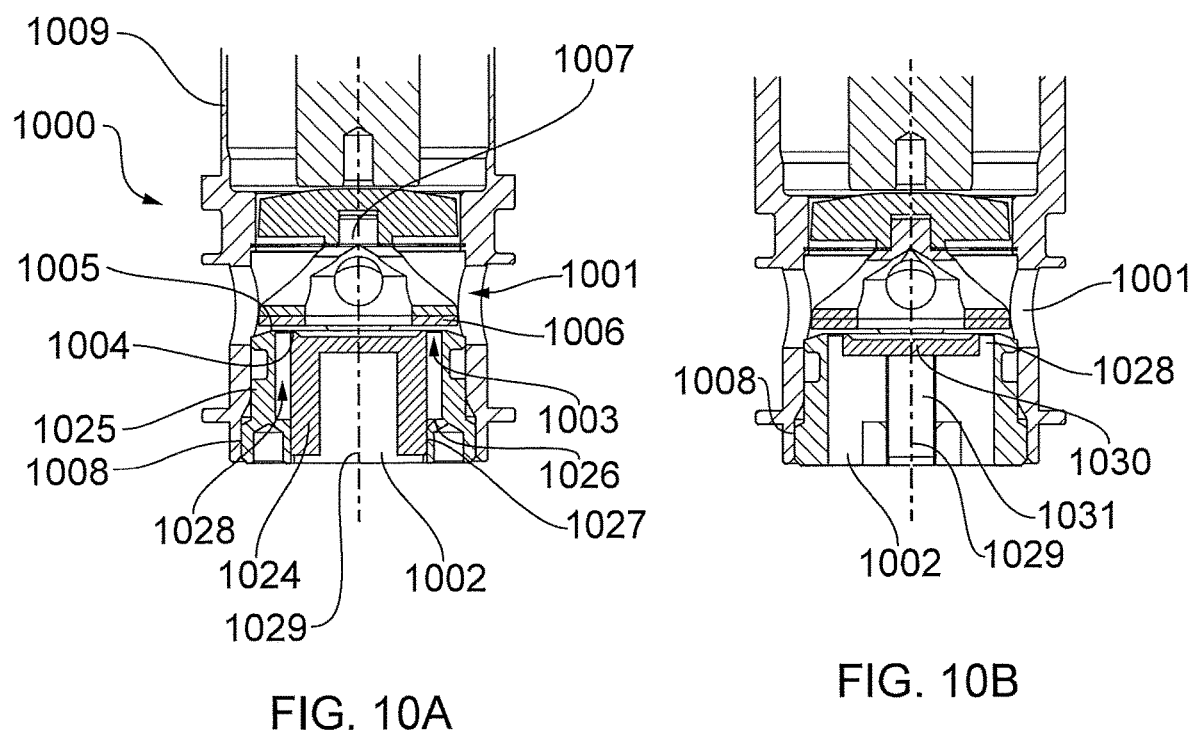
FIG. 10A
FIG. 10B

VALVE ASSEMBLY

CROSS-REFERENCE TO RELATED APPLICATIONS

This application is a United States national stage application of, and claims priority to, International Application No. PCT/EP2019/062894 filed May 17, 2019, which was published as International Publication No. WO 2019/219957 and which claims the benefit of EP Patent Application No. 18173331.2, filed May 18, 2018.

FIELD OF THE INVENTION

The present invention relates to an improved valve assembly and, in particular, to a small valve assembly, typically having valve seat dimensions of the order of around 1-2 cm, having an improved construction and an improved flow characteristic.

BACKGROUND TO THE INVENTION

Fluid control valves are used in a wide variety of applications to control the flow of a fluid. The fluid being controlled may comprise a gas, a liquid, or a combination thereof. In some situations, the fluid may also include suspended particulates. While fluid control valves vary widely in the specific configuration used to open and close a fluid communication path through the valve, one specific type of valve actuation is performed using a solenoid.

In solenoid-actuated valves, an electric current passes through an electromagnetic coil, with the coil typically formed around a magnetic core. The coil generally comprises a wire that is wrapped around a bobbin numerous times resulting in a plurality of so-called turns. The energized solenoid generates a magnetic field. The strength of the magnetic field is proportional to the number of turns as well as the electrical current provided to the wire.

As is well-known in the art, in order to increase the magnetic field provided by a solenoid, the number of turns can be increased and/or the current provided to the wire can be increased. The magnetic field typically operates on a movable armature connected to a plunger which is configured to engage a valve seat, which surrounds an inlet and/or outlet through which fluid may pass, to vary a flow restriction created by the valve seat and a sealing portion of the plunger.

Typically, the valve also includes a spring or other biasing member that generates a biasing force in opposition to the magnetic field. Therefore, in the absence of a magnetic field generated by the solenoid, the valve member is moved into a normally open or a normally closed position. In an open position, the plunger is in a positioned away from the valve seat, allowing fluid to pass through the inlet and/or outlet. In a closed position, the sealing portion of the plunger abuts the valve seat so as to close the inlet and/or outlet, preventing fluid from passing through the inlet and/or outlet.

When the valve assembly is required to be small and light, it is important to control the flow characteristics of the valve, for example, to achieve a sufficiently high flow rate. However, there are challenges in achieving this when increases in the plunger stroke length and cross-sectional area of the valve seat may be restricted in a small valve assembly. Particularly in small valves, the lack of space available within the body of the valve may force the design of complicated and/or additional valve parts and create tortuous flow paths with many direction changes and flow restrictions, etc. The consequences of this are an increase of the cost of the valve, a decrease of the manufacturability of the valve and rather unpredictable flow capabilities.

Indeed, to accurately control the flow characteristics of a valve, the tolerances between the components and resulting flow restrictions must be carefully controlled. Achieving accurate tolerances has in the past been achieved by using a small number of complex parts or unitary components, reducing the scope for error arising from the relative positions of the components. Therefore, small valves have previously been manufactured using as few parts as possible. To achieve the same functionality, such parts may have to have a complicated structure. However, producing single parts with complicated structures presents its own challenges. Moulding or machining complex parts becomes increasingly difficult as the size of the parts decreases, and this difficulty leads to the necessity for more expensive machining equipment.

There is therefore a need for improvements in valve assemblies.

SUMMARY OF THE INVENTION

In devising the solution of the present invention, the inventors have recognised the restrictions in conventional methods of producing valves with concentric orifices and have devised new arrangements to address the drawbacks of the prior art.

According to a first aspect of the invention, there is provided a valve assembly having a valve seat comprising an inner concentric valve seat and an outer concentric valve seat, the inner concentric valve seat being arranged radially inward of the outer concentric valve seat to provide an annular opening therebetween; a moveable plunger being moveable between a closed position and an open position to vary a flow restriction at the inner and outer concentric valve seats, and arranged to simultaneously seal the inner concentric valve seat and the outer concentric valve seat when in the closed position; an inner valve member comprising the inner concentric valve seat; an outer valve member comprising the outer concentric valve seat; wherein the inner valve member is a separate component from the outer valve member and is mounted in fixed relation to the outer valve member via mounting means, the mounting means comprising: radial alignment means configured to maintain concentricity of the inner concentric valve seat relative to the outer concentric valve seat; and axial alignment means configured to maintain axial alignment of the inner concentric valve seat relative to the outer concentric valve seat along an axis, the axis being substantially orthogonal to a plane of the concentric valve seats.

The assembly of the invention provides an efficient alternative solution to the problem of how to manufacture a valve assembly having concentric inner and outer valve seats, solving both manufacturing difficulties and alignment needs experienced with concentric valve seat arrangements. This can permit smaller-scale valve seat arrangements to be manufactured in an efficient way.

The radial alignment means may have at least one radially facing abutting face, provided on at least one of the inner valve member and the outer valve member. The use of radially facing faces to provide alignment means permits efficient axial assembly of the components, whilst providing the required mutual alignment of the parts.

The at least one radially facing abutting face may form an interference fit with an opposing face of the valve assembly.

An interference fit can provide reliable mounting and a simple manufacturing process.

The radial alignment means may comprise at least one radially facing abutting face, provided on the inner valve member and at least one radially-facing abutting face provided on the outer valve member.

A first of the abutting faces may be provided on the inner valve member, and a second of the abutting faces may be provided on the outer valve member and abuts the first of the abutting faces.

The inner valve member may be a substantially tubular member extending from the inner valve seat toward a port of the valve assembly. The outer valve member may be a substantially tubular member extending from the outer valve seat toward a side and/or end port of the valve assembly.

The outer valve member may comprise a bore, the bore having a first diameter in a first portion of the bore, and an area of reduced inner diameter in a second portion of the bore, at least one of the abutting faces being provided on the area of reduced inner diameter. Providing a reduction in bore size in this way can be an efficient way to create the required spacing and alignment between inner and outer valve seats.

The axial alignment means may have a mechanical fixation between at least one radially facing abutting face provided on at least one of the inner and outer valve members, and an opposing radially abutting face of the assembly. In some examples, the mechanical fixation comprises an interference fit.

The valve assembly may have a first fluid port and a second fluid port. Throughout the rest of the present application, the term "first fluid port" may be used interchangeably with the term "side fluid port", and the term "second fluid port" may be used interchangeably with the term "end fluid port".

It will be appreciated that the first fluid port and the second fluid port could be the fluid inlet and the fluid outlet, respectively, or vice versa. In other words, the presently claimed invention is not restricted by the direction of fluid flow within the valve assembly.

Preferably, the axial alignment means provides a fluid seal, fluidly isolating the second fluid port from the first fluid port when the valve is in the closed position.

In some examples, the first fluid port is provided between the concentric valve seats and the alignment means.

The valve assembly may have an axially extending annular flow channel formed between at least a portion of the inner valve member and the outer valve member.

In some examples, the second fluid port may be in fluid communication with the annular flow channel. In other examples, the second fluid port may be in fluid communication with an inner edge of the inner concentric valve seat and an outer edge of the outer concentric valve seat when the valve is in the closed position.

The valve assembly may further comprise a valve body member within which at least one of the inner and outer valve members is mounted.

The radial alignment means may comprise a radially outer surface of the outer valve member being in contact with a radially inner surface of the valve body member. Additionally or alternatively, the radial alignment means may be a radially outer surface of the inner valve member being in contact with a radially inner surface of the valve body member.

The valve assembly may further comprise supplementary radial alignment means, axially spaced from the radial alignment means. The supplementary axial alignment means comprises a radial projection.

The axial alignment means may comprise a radially extending step, provided on the inner valve member, against which the outer valve member abuts.

Now turning to the paths through which fluid may travel between the fluid ports, a first fluid pathway may be provided between the first fluid port and the second fluid port passing via the inner valve seat when the movable plunger is in the open position. There may also be provided a second fluid pathway between the first fluid port and the second fluid port passing via the outer valve seat when the movable plunger is in the open position.

At least one fluid flow path through the moveable plunger may comprise an opening configured to form part of the first fluid pathway or the second fluid pathway, the cross-sectional area of the flow path through the moveable plunger being at least half of the cross-sectional area of the gap between the plunger and the respective inner or outer valve seat of the first or second fluid pathway of which the opening forms a flow path when the movable plunger is in the open position.

In some examples, the first fluid pathway and the second fluid pathway are the only fluid pathways between the first fluid port and the second fluid port when the movable plunger is in the open position.

The advantage of having only the first fluid port and the second fluid port in the valve assembly, i.e. having only one inlet and only one outlet, is that the design of the valve assembly may be simple and compact. However, in addition to the first fluid port and the second fluid port, the valve assembly may have other fluid ports, and so the valve assembly may have multiple inlets and/or outlets in some examples. The location of the inlet(s) and outlet(s) may be various depending on the specific application of the valve assembly. The valve may be a proportional valve or a switching (i.e. ON/OFF valve). The valve may be a direct valve or a pressure compensated valve.

Preferably, the valve assembly may further comprise a moveable diaphragm for separating a portion of the moveable plunger from the opening through the body of the moveable plunger. By "separating", it is meant that the moveable plunger is positioned such that there is no direct fluid pathway from said portion of the moveable plunger and the opening through the body of the moveable plunger. The valve assembly may further comprise pressure compensation means for ensuring that the fluid inlet and a portion of the moveable plunger that is not in a direct flow path between the first and second fluid ports are under substantially the same pressure when the moveable plunger is in the closed position. Advantageously, this means that the moveable plunger may be kept from moving to its open position unintentionally.

The pressure compensation means may be a pressure equalising fluid pathway from the first fluid port or the second fluid port to a portion of the moveable plunger that is not in a direct flow path between the first fluid port and the second fluid port. The pressure equalising pathway usually extends from the fluid port that is a fluid inlet to a portion of the moveable plunger that is not in a direct flow path between the both fluid inlet and the fluid outlet or is at least not in a direct flow path between them. This is because the fluid inlet is usually at a higher pressure than the fluid outlet.

The valve assembly may further comprise a shim for varying the area of the moveable diaphragm that can be biased by pressure from the first fluid port or the second fluid port. This advantageously provides a flexible approach to varying the pressure that is exerted on the portion of the moveable plunger that is not in a direct flow path between the first and second fluid ports.

Preferably, the valve assembly may further comprise actuating means for actuating the moveable plunger, in use, between the first position and the second position. The actuating means may comprise a solenoid that actuates the moveable plunger upon the application of a current through the solenoid. In this case, the moveable plunger may comprise or consist of a magnetic material.

In such electrically actuated solenoid valve assemblies, an electric current may be applied through the solenoid which energises it and the magnetic field that is created as a result controls the movement of the magnetic plunger that opens and closes the valve, thus allowing or preventing fluid from flowing through the valve. When the solenoid is energised, the plunger may overcome the force of a spring that holds the plunger in a normally open or normally closed position and be accelerated towards or away from a valve seat. A hold voltage may be applied to the solenoid in order to advance the movement of the plunger towards or away from the valve seat and/or to retain the valve in a closed or open position. Sometimes, a braking voltage may also be applied in order to brake the movement of the plunger so as to lessen its impact upon the valve seat.

By way of comparison to these solenoid actuated valve assemblies, valve assemblies employing other actuator technology may display the following disadvantages. A voice coil may be more expensive, create less force and have a larger size. A shape-memory allow (SMA) may have a slower response time and have a larger size, in particular height-wise.

According to a second aspect of the invention, there is provided a method of assembling a valve sub-assembly, comprising any or all of the steps of: providing an inner valve member comprising an inner concentric valve seat; providing an outer valve member comprising an outer concentric valve seat; arranging the inner valve member so as to position the inner concentric valve seat radially inward of the outer concentric valve seat to provide an annular flow opening therebetween; radially aligning the inner concentric valve seat relative to the outer concentric valve seat to maintain concentricity thereof; axially aligning the inner concentric valve seat relative to the outer concentric valve seat along an axis, the axis being substantially orthogonal to a plane of the concentric valve seats; providing a radial alignment means of the assembly, to maintain concentricity of the inner concentric valve seat relative to the outer concentric valve seat; providing an axial alignment means of the assembly, to maintain axial alignment of the inner concentric valve seat relative to the outer concentric valve seat along an axis; such that the inner valve member is a separate component from the outer valve member and is mounted in fixed relation to the outer valve member via mounting means, the mounting means comprising the axial and radial alignment means. The method may further comprise any or all of: providing a moveable plunger, being moveable between a closed position and an open position to vary a flow restriction at the valve seat, and arranged to simultaneously seal the inner concentric valve seat and the outer concentric valve seat when in the closed position; and aligning the moveable plunger relative to the concentric valve seats such that the moveable plunger simultaneously seals the inner concentric valve seat and the outer concentric valve seat when in the closed position.

The step of axially aligning the inner concentric valve seat relative to the outer concentric valve seat may comprise providing a support member configured to support the inner and outer valve seats in a desired axial alignment, providing a first of the inner and outer valve members on the support, and axially aligning the second of the inner and outer valve members relative to the first by positioning both of the inner and outer valve seats on the support. The support may comprise a planar surface and axially aligning the inner and outer valve members may comprise positioning both of the inner and outer valve seats on the planar surface.

The method may further comprise the step of axially pressing the first of the inner and outer valve members into position relative to the second of the inner and outer valve members to create an interference fit which maintains the relative axial alignment of the inner and outer valve seats.

In some examples, the method further comprises axially pressing the first of the inner and outer valve members into engagement with the second of the inner and outer valve members, to provide an interference fit which maintains the relative axial alignment of the inner and outer valve seats.

In a further aspect, the inventors have recognised that improved valve assemblies having better control over the volume of fluid that passes between the inlet and the outlet when the plunger is in an open position are required. In particular, they have recognised that by introducing a fluid flow path in a moveable plunger of a valve assembly, a dual fluid pathway can be provided, in that fluid may flow between two fluid ports of the valve assembly via two flow paths, i.e. a first flow path directly between the two fluid ports and a second flow path through the plunger. The result is that a higher flow rate may be achieved for a given valve assembly size and the proportion of fluid passing through each flow path may be optimised for a particular application.

Thus, according to a further aspect of the invention, there is provided a valve assembly, comprising: a first fluid port; a second fluid port; a valve seat comprising an inner valve seat and an outer valve seat, the inner valve seat being arranged within the outer valve seat; a moveable plunger, having a body and being moveable between a closed position and an open position to vary a flow restriction at the valve seat, and arranged to simultaneously seal the inner valve seat and the outer valve seat when in the closed position; a first fluid pathway between the first fluid port and the second fluid port passing via the inner valve seat when the movable plunger is in the open position; a second fluid pathway between the first fluid port and the second fluid port passing via the outer valve seat when the movable plunger is in the open position; and at least one fluid flow path through the body of the moveable plunger comprising an opening configured to form part of the first fluid pathway or the second fluid pathway, and wherein the cross-sectional area of the flow path through the moveable plunger is at least half of the cross-sectional area of the gap between the plunger and the respective inner or outer valve seat of the first or second fluid pathway of which the opening forms a flow path when the movable plunger is in the open position.

The at least one fluid flow path through the body of the moveable plunger allows for improved flow characteristics of the valve assembly in terms of increased flow for a given plunger stroke length and a given cross-sectional area of the valve seat, less flow resistance and less turbulence. This is particularly advantageous for small valves, for example, having dimensions of the order of $10^{-2}$ m (e.g. at the valve seat diameter, being, for example, around 10 mm or less) and cross-sectional areas of the valve seat of the order of $10^{-5}$ $m^2$, and for which the plunger stroke length may typically be of the order of $10^{-3}$ m, or around 1 mm or less. As such, the advantages of aspects of this invention can be particularly beneficial in small valves, in which a diameter of the outer valve seat is around 10 cm or less, and especially where it is around 10 mm or less. Preferred plunger stroke lengths are preferably around one quarter of the difference between the diameters of the inner and outer concentric valve seats. Thus, subtracting the inner valve seat diameter from the outer valve seat diameter, and dividing the result by four, can give a suitable stroke length in certain preferred embodiments.

Alternatively, for a given flow requirement, the at least one fluid flow path through the body of the moveable plunger advantageously permits a smaller plunger stroke length for a given cross-sectional area of the valve seat.

Moreover, the at least one fluid flow path through the body of the moveable plunger allows for decreased pressure within the valve assembly or increased back pressure sensitivity for the same flow rate.

The metric of the cross-sectional area of the flow path through the moveable plunger being at least half of the cross-sectional area of the gap between the plunger and the respective inner or outer valve seat of the first or second fluid pathway of which the opening forms a flow path when the movable plunger is in the open position may be considered a minimum requirement in order to show significant improvements in flow characteristic of the valve assembly compared to prior art arrangements.

It will be appreciated that the first fluid port and the second fluid port could be the fluid inlet and the fluid outlet, respectively, or vice versa. In other words, the presently claimed invention is not restricted by the direction of fluid flow within the valve assembly.

The advantage of having only the first fluid port and the second fluid port in the valve assembly, i.e. having only one inlet and only one outlet, is that the design of the valve assembly may be simple and compact. However, in addition to the first fluid port and the second fluid port, the valve assembly may have other fluid ports, and so the valve assembly may have multiple inlets and/or outlets in some examples. The location of the inlet(s) and outlet(s) may be various depending on the specific application of the valve assembly. The valve may be a proportional valve or a switching (i.e. ON/OFF valve). The valve may be a direct valve or a pressure compensated valve.

In one example, when the moveable plunger is in the open position, the first fluid pathway directly connects the first fluid port and the second fluid port, and the second fluid pathway, of which the fluid flow path through the body of the moveable plunger forms a part, also connects the first fluid port and the second fluid port. In this example, when the moveable plunger is in the closed position, fluid from one of the first and second fluid ports reaches the outer edge of the inner valve seat where it is prevented from passing through by the seal created by the moveable plunger, and fluid from the other of the first and second fluid ports passes through the fluid flow path through the body of the moveable plunger and reaches the outer edge of the outer valve seat where it is prevented from passing through by the seal created by the moveable plunger.

In another example, when the moveable plunger is in the open position, the second fluid pathway directly connects the first fluid port and the second fluid port, and the first fluid pathway, of which the fluid flow path through the body of the moveable plunger forms a part, also connects the first fluid port and the second fluid port. In this example, when the moveable plunger is in the closed position, fluid from one of the first and second fluid ports reaches the outer edge of the outer valve seat where it is prevented from passing through by the seal created by the moveable plunger, and fluid from the other of the first and second fluid ports passes through the fluid flow path through the body of the moveable plunger and reaches the outer edge of the inner valve seat where it is prevented from passing through by the seal created by the moveable plunger.

It may be preferable that the first fluid pathway and the second fluid pathway are the only fluid pathways between the first fluid port and the second fluid port when the movable plunger is in the open position. For example, the fluid flow as described in the two above examples may represent the only fluid pathways in the valve assembly. Thus, fluid flow is limited between said two fluid pathways and so it is easier to control. Particularly in small valves of the order of magnitude described above, having a limited number of fluid pathways allows for simplicity of the valve design, lower manufacturing costs and better manufacturability of the valves. Further, particularly in small valves of the order of magnitude described above, having a limited number of fluid pathways allows for simplicity of the fluid pathway design and better efficiency of the fluid pathway due to less direction changes of the fluid.

In some preferable arrangements, the cross-sectional area of the flow path through the opening in the moveable plunger may be at least 0.6 or 60%, 0.7 or 70%, 0.8 or 80%, 0.9 or 90%, equal to, or 100% or greater, of the cross-sectional area of the gap between the plunger and the respective inner or outer valve seat of the first or second fluid pathway of which the opening forms a flow path when the movable plunger is in the open position.

In other preferable arrangements, the cross-sectional area of the flow path through the opening in the moveable plunger may be at least two times, preferably at least 10 times, more preferably at least 50 times, the cross-sectional area of the gap between the plunger and the respective inner or outer valve seat of the first or second fluid pathway of which the opening forms a flow path when the movable plunger is in the open position. This generally defines a minimum cross sectional area of an opening through the moveable plunger, such that this defines the maximum restriction on the flow through the opening in the moveable plunger.

The greater the cross-sectional area of the opening in the moveable plunger for a fixed cross-sectional area of the gap between the plunger and the respective inner or outer valve seat of the first or second fluid pathway of which the opening forms a flow path, the higher the flow rate of fluid between the first and second fluid ports. In some particularly preferable examples, the cross-sectional area of the opening in the moveable plunger may be much higher than half of the cross-sectional area of the gap between the plunger and the respective inner or outer valve seat of the first or second fluid pathway of which the opening forms a flow path when the movable plunger is in the open position. This has the advantage of delivering a very high fluid output for a given plunger stroke length. It is preferable, for optimal valve control, that the greatest flow restriction in the flow path is represented by the maximum available opening at the valve seat, since this is that opening that is controlled to operate the valve as a flow restriction. Configuring the valve in this way provides efficient flow paths through the remaining components of the valve.

The fixed stroke of the moveable plunger may be between 0.05 mm and 1.0 mm. Preferably, the fixed stroke of the moveable plunger may be between 0.1 mm and 0.3 mm. More preferably, the fixed stroke of the moveable plunger may be 0.2 mm. Additionally or alternatively, the fixed stroke length may be less than a quarter of the diameter of the opening through the body of the moveable plunger.

In some examples, when the movable plunger is in the open position, the cross-sectional area, or the linear distance from valve seat to plunger, of the gap between the plunger and the respective inner or outer valve seat of the first or second fluid pathway of which the opening forms a flow path may be substantially equal to the cross-sectional area, or the linear distance from valve seat to plunger, of the gap between the plunger and the respective inner or outer valve seat of the first or second fluid pathway of which the opening does not form a flow path. This is typically the case when the moveable plunger seals the inner and outer valve seats across a single plane.

Alternatively, the cross-sectional area of the gap between the plunger and the respective inner or outer valve seat of the first or second fluid pathway of which the opening forms a flow path may be greater than or less than the cross-sectional area of the gap between the plunger and the respective inner or outer valve seat of the first or second fluid pathway of which the opening does not form a flow path. This may occur when the moveable plunger does not seal the inner and outer valve seats across a single plane.

Preferably, the valve assembly may further comprise a moveable diaphragm for separating a portion of the moveable plunger from the opening through the body of the moveable plunger. By "separating", it is meant that the moveable plunger is positioned such that there is no direct fluid pathway from said portion of the moveable plunger and the opening through the body of the moveable plunger. The valve assembly may further comprise pressure compensation means for ensuring that the fluid inlet and a portion of the moveable plunger that is not in a direct flow path between the first and second fluid ports are under substantially the same pressure when the moveable plunger is in the closed position. Advantageously, this means that the moveable plunger may be kept from moving to its open position unintentionally.

The pressure compensation means may be a pressure equalising fluid pathway from the first fluid port or the second fluid port to a portion of the moveable plunger that is not in a direct flow path between the first fluid port and the second fluid port. The pressure equalising pathway usually extends from the fluid port that is a fluid inlet to a portion of the moveable plunger that is not in a direct flow path between the both fluid inlet and the fluid outlet or is at least not in a direct flow path between them. This is because the fluid inlet is usually at a higher pressure than the fluid outlet.

The valve assembly may further comprise a shim for varying the area of the moveable diaphragm that can be biased by pressure from the first fluid port or the second fluid port. This advantageously provides a flexible approach to varying the pressure that is exerted on the portion of the moveable plunger that is not in a direct flow path between the first and second fluid ports.

Preferably, the valve assembly may further comprise actuating means for actuating the moveable plunger, in use, between the first position and the second position. The actuating means may comprises a solenoid that actuates the moveable plunger upon the application of a current through the solenoid. In this case, the moveable plunger may comprise or consist of a magnetic material.

In such electrically actuated solenoid valve assemblies, an electric current may be applied through the solenoid which energises it and the magnetic field that is created as a result controls the movement of the magnetic plunger that opens and closes the valve, thus allowing or preventing fluid from flowing through the valve. When the solenoid is energised, the plunger may overcome the force of a spring that holds the plunger in a normally open or normally closed position and be accelerated towards or away from a valve seat. A hold voltage may be applied to the solenoid in order to advance the movement of the plunger towards or away from the valve seat and/or to retain the valve in a closed or open position. Sometimes, a braking voltage may also be applied in order to brake the movement of the plunger so as to lessen its impact upon the valve seat.

By way of comparison to these solenoid actuated valve assemblies, valve assemblies employing other actuator technology may display the following disadvantages. A voice coil may be more expensive, create less force and have a larger size. A shape-memory allow (SMA) may have a slower response time and have a larger size, in particular height-wise.

In preferable examples of the present invention, the inner valve seat and the outer valve seat are arranged concentrically. A concentric design provides the advantage of being compact and optimising the use of space within the valve assembly, which may be limited, for example, in a small valve assembly such as a microfluidic valve assembly.

According to a further aspect of the invention, there is provided a valve system, comprising at least two valve assemblies of any preceding embodiment, wherein the distance between adjacent valve assemblies is less than 50 mm, preferably less than 40 mm, more preferably less than 20 mm.

The advantages described above in relation to a single valve assembly also equally apply to the valve system.

BRIEF DESCRIPTION OF THE DRAWINGS

Embodiments of the present invention will now be described, by non-limiting example only, with reference to the accompanying drawings, in which:

FIG. 10A shows an orthogonal cross-sectional view of a valve assembly in its open position in accordance with a sixth embodiment of the present invention;

FIG. 10B shows another orthogonal cross-sectional view of a valve assembly in its open position in accordance with the sixth embodiment of the present invention;

FIG. 10C shows a schematic view of an outer valve member and a pair of mounts which form part of the valve assembly in accordance with the sixth embodiment of the present invention;

DETAILED DESCRIPTION OF EMBODIMENTS

The following detailed description and figures provide examples of how the present invention can be implemented and should not be seen as limiting examples, rather illustrations of how the various features of the valve assembly disclosed herein can be combined, although other optional combinations will be evident upon reading the following description in light of the figures.

Figure 1:
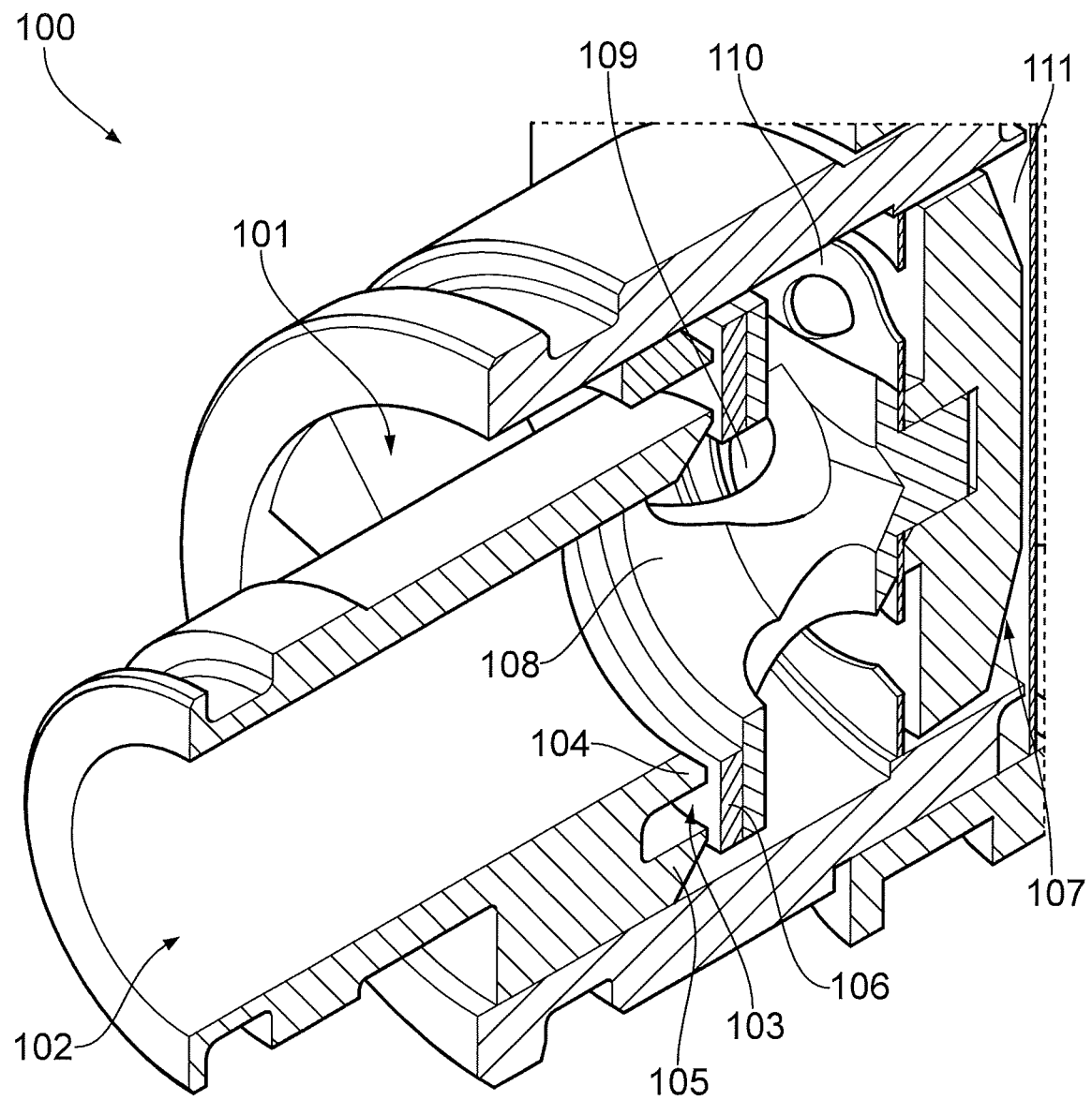
FIG. 1 shows an isometric cross-sectional view of a valve assembly in accordance with a first embodiment of the present invention.
Figure 2:
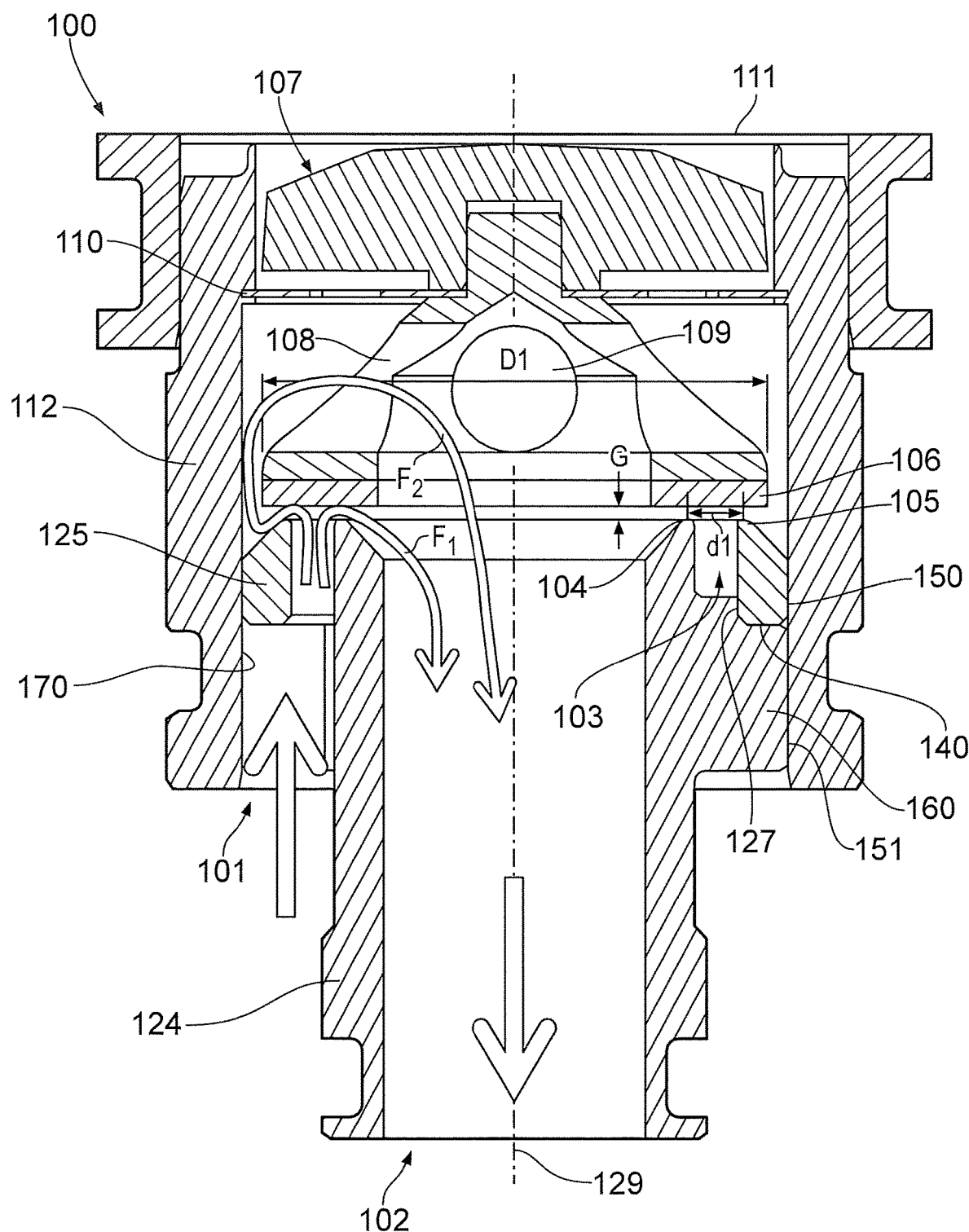
FIG. 2 shows an orthogonal cross-sectional view of a valve assembly in its open position in accordance with the first embodiment of the present invention.
Figure 3:
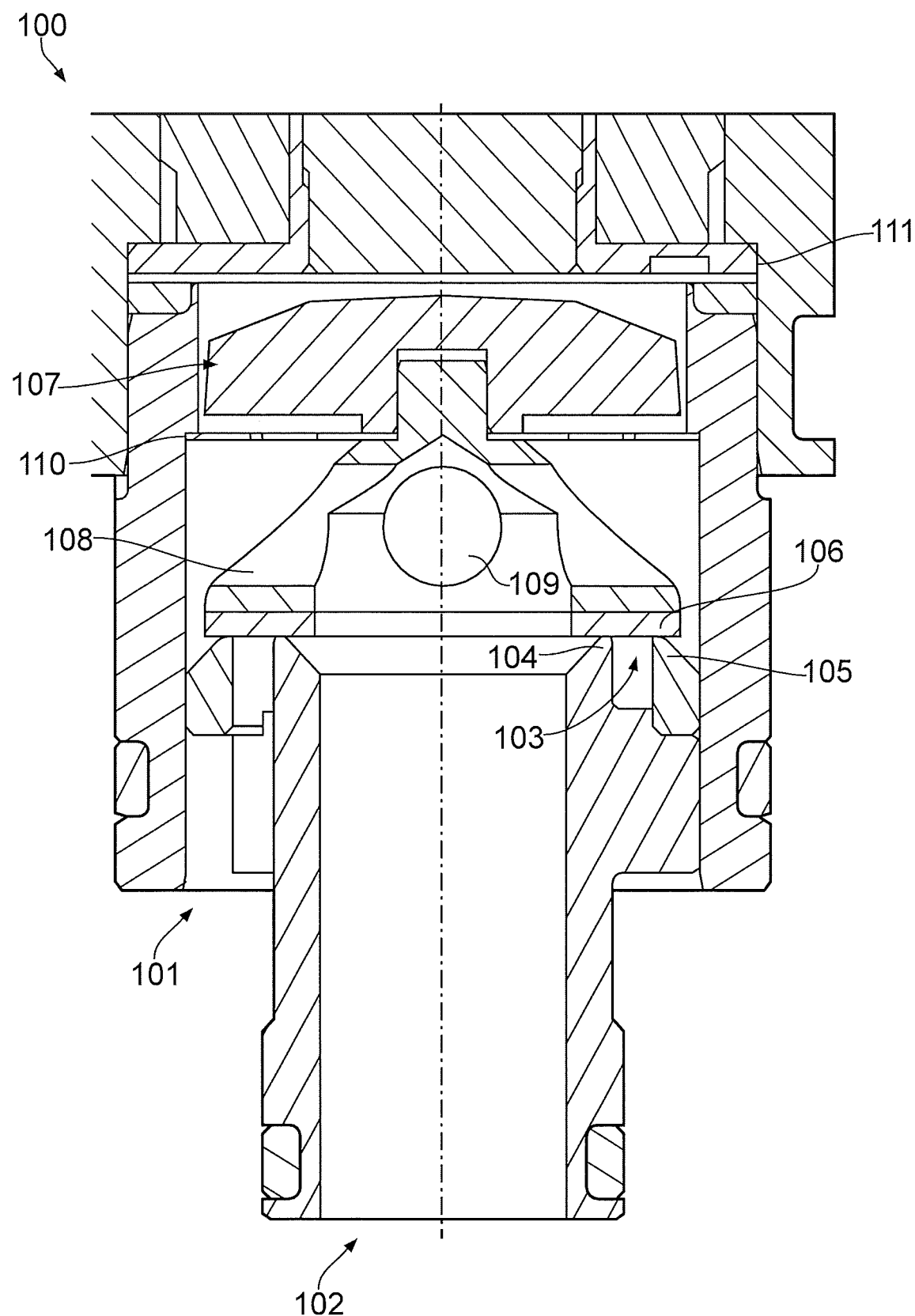
FIG. 3 shows an orthogonal cross-sectional view of a valve assembly in its closed position in accordance with the first embodiment of the present invention.

In FIGS. 1, 2 and 3, a valve assembly 100 according to a first embodiment of the present invention is shown, FIG. 1 being an isometric cross-sectional view and FIGS. 2 and 3 being orthogonal cross-sectional views. FIGS. 1 and 3 show the valve assembly in its closed position where FIG. 2 shows the valve assembly in its open position. The diameter of the valve assembly 100 of the illustrated example is about 16 mm, but other examples may be larger or smaller.

The valve assembly 100 comprises a first fluid port 101 and a second fluid port 102. In this embodiment, the first fluid port 101 is the fluid inlet and the second fluid port 102 is the fluid outlet. However, it will be appreciated that in other embodiments, the first fluid port could be the fluid outlet and the second fluid port could be the fluid inlet. The direction of fluid flow is shown by the arrows in FIG. 2.

The valve assembly 100 further comprises a valve seat 103 comprising an inner valve seat 104 and an outer valve seat 105 in a concentric arrangement, the inner valve seat 104 being arranged within the outer valve seat 105, and a valve seal 106. The assembly further comprises a moveable plunger 107 comprising an upper magnetic portion and a body 108 having an opening 109. A biasing means, preferably in the form of a spring 110 can also be provided, as can a non-moveable insulating membrane 111 for preventing fluid from coming into contact with a solenoid (not shown in FIG. 1) of the valve assembly 100.

The moveable plunger 107 is moveable between a closed position and an open position to vary a flow restriction at the valve seat and is preferably arranged to simultaneously seal the inner valve seat 104 and the outer valve seat 105. In FIG. 2, it can be seen that, in certain preferred embodiments a largest diameter D1 of the moveable plunger 107 can be around 10.2 mm, and a radial distance d1 between the inner valve seat 104 and the outer valve seat 105 may be 0.9 mm. The overall stroke length of the moveable plunger 107 may be about 0.2 mm.

A first fluid pathway $F_1$ is arranged between the first fluid port 101 and the second fluid port 102, passing via the inner valve seat 104 (i.e. between the inner valve seat 104 and the valve seal 106) when the movable plunger 107 is in the open position. A second fluid pathway $F_2$ is arranged between the first fluid port 101 and the second fluid port 102, passing via the outer valve seat 105 (i.e. between the outer valve seat 105 and the valve seal 106), when the movable plunger 107 is in the open position. Further, a fluid flow path through the body 108 of the moveable plunger 107 comprising an opening 109 is configured to form part of the second fluid pathway $F_2$. The cross-sectional area of the flow path through the moveable plunger 107, i.e. the minimum cross-sectional area, orthogonal to the flow direction, through which the fluid flow has to flow on the flow path through the moveable plunger 107, is at least approximately 50 times the cross-sectional area of the gap between the plunger and the outer valve seat 105 when the movable plunger 107 is in the open position. However, in other embodiments, this proportion may be as low as half of the cross-sectional area of the gap between the plunger and the outer valve seat 105. The flow path through the moveable plunger 107 is on the second fluid pathway $F_2$ of which the opening 109 forms a part.

As shown in FIG. 2, the depth G of the gap (or linear distance) between the plunger and the outer valve seat 105 of the second fluid pathway, of which the opening 109 forms a flow path, is substantially equal to the depth G of the gap (or linear distance) between the plunger and the inner valve seat 104 of the first fluid pathway, of which the opening 109 does not form a flow path. In other words, the moveable plunger 107 seals the inner and outer valve seats 104, 105 across a single plane.

In the open position shown in FIG. 2, fluid enters the valve assembly 100 through the first fluid port 101 and is able to flow via two paths. The first fluid pathway $F_1$ directly connects the first fluid port 101 and the second fluid port 102, and the second fluid pathway $F_2$, of which a fluid flow path or opening 109 through the body 108 of the moveable plunger 107 forms a part, also connects the first fluid port 101 and the second fluid port 102. The first fluid pathway and the second fluid pathway are, in preferred embodiments, the only fluid pathways between the first fluid port 101 and the second fluid port 102 when the movable plunger is in the open position.

In this embodiment, when the moveable plunger 107 is in the closed position, as shown in FIGS. 1 and 3, fluid from the second fluid port 102 reaches the outer edge of the inner valve seat 104 where it is prevented from passing through by the valve seal 106 created by the moveable plunger 107. Fluid from the first fluid port 101 can extend through the fluid flow path or opening 109 through the body 108 of the moveable plunger 107 and can reach the outer edge of the outer valve seat 105, where it is prevented from passing through by the valve seal 106 created by the moveable plunger 107. In this embodiment, the valve seal 106 is a seal made of a compliant material such as rubber, although any suitable sealant material can be used, be it of a compliant nature or not.

In the electrically actuated solenoid valve of FIGS. 1, 2, and 3, an upper portion of the moveable plunger 107 is made of a magnetic material. Thus, when an electric current is applied through the solenoid, the solenoid is energised and the magnetic field that is created as a result controls the movement of the magnetic moveable plunger 107 that opens and closes the valve, thus allowing or preventing fluid from flowing through the valve. When the solenoid is energised, the plunger may overcome the force of the spring 110 that holds the plunger in a normally closed position and be accelerated away from the valve seat 103. It will be appreciated that in other embodiments, the valve assembly may be a normally open valve assembly and so energisation of the solenoid causes the plunger to overcome the force of the spring that holds the plunger in a normally open position, such that it is accelerated towards the valve seat. In this embodiment, the spring 110 is a flat spring, although other biasing means may be employed to provide the function of the spring described above.

The non-moveable insulating membrane 111 is preferably provided above the moveable plunger 107, as shown in FIGS. 1, 2 and 3. The non-moveable insulating membrane 111 acts to isolate a portion of the moveable plunger 107 from the flow path through the body of the moveable plunger 107, in particular to prevent fluid from coming into contact with a solenoid (not shown in FIGS. 1, 2 and 3) of the valve assembly 100.

Figure 4:
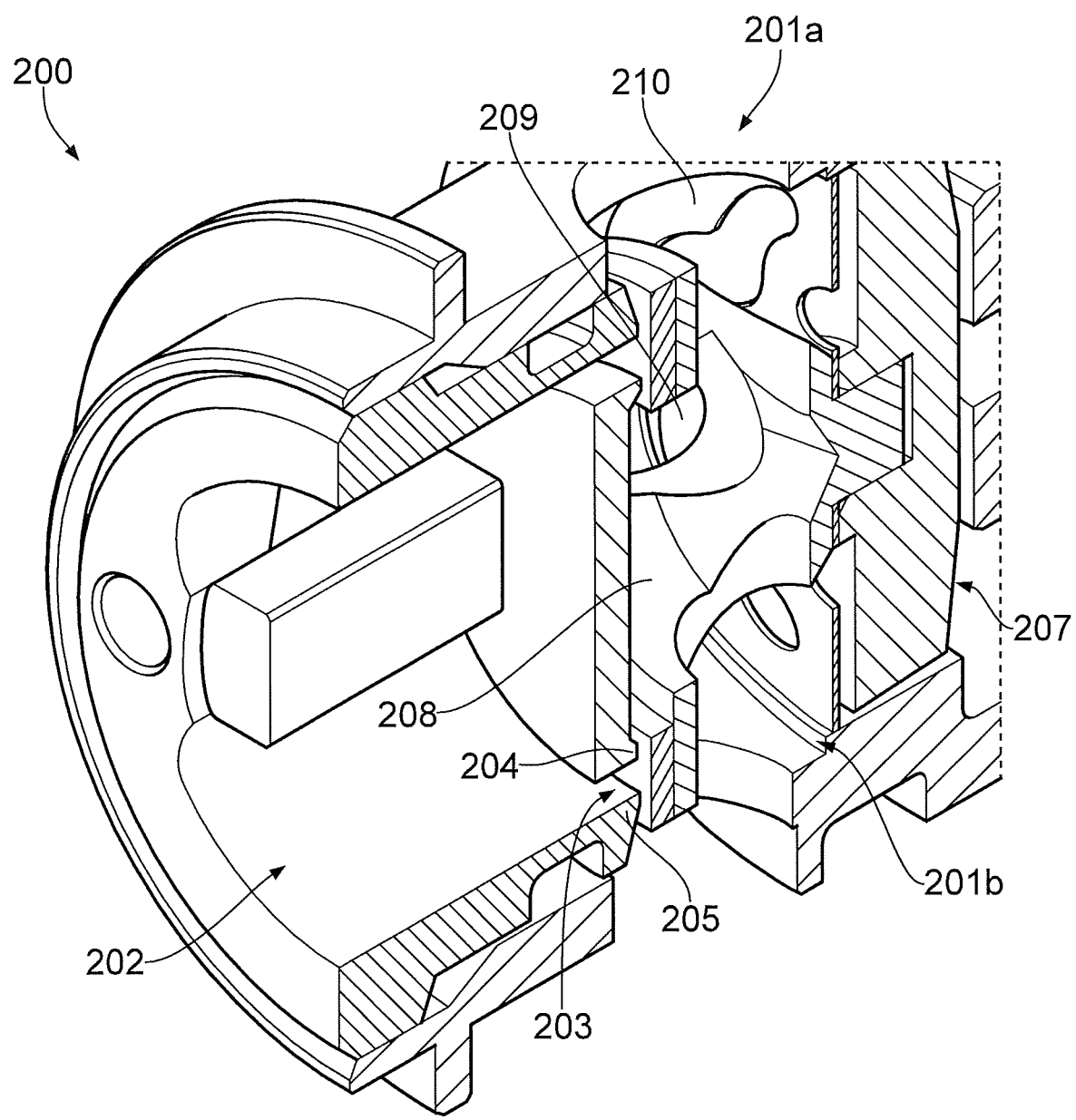
FIG. 4 shows an isometric cross-sectional view of a valve assembly in accordance with a second embodiment of the present invention.
Figure 5:
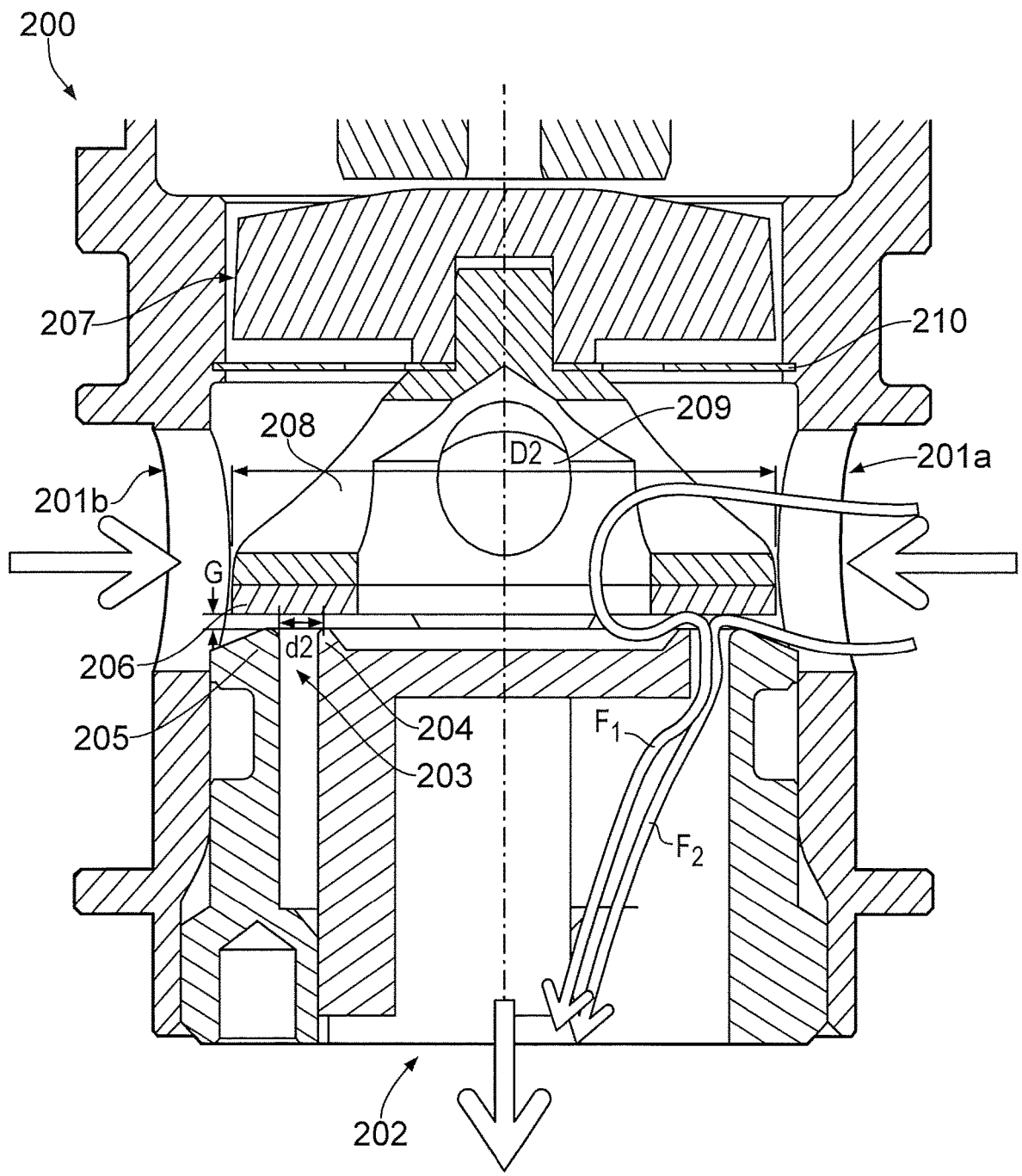
FIG. 5 shows an orthogonal cross-sectional view of a valve assembly in its open position in accordance with the second embodiment of the present invention.
Figure 6:
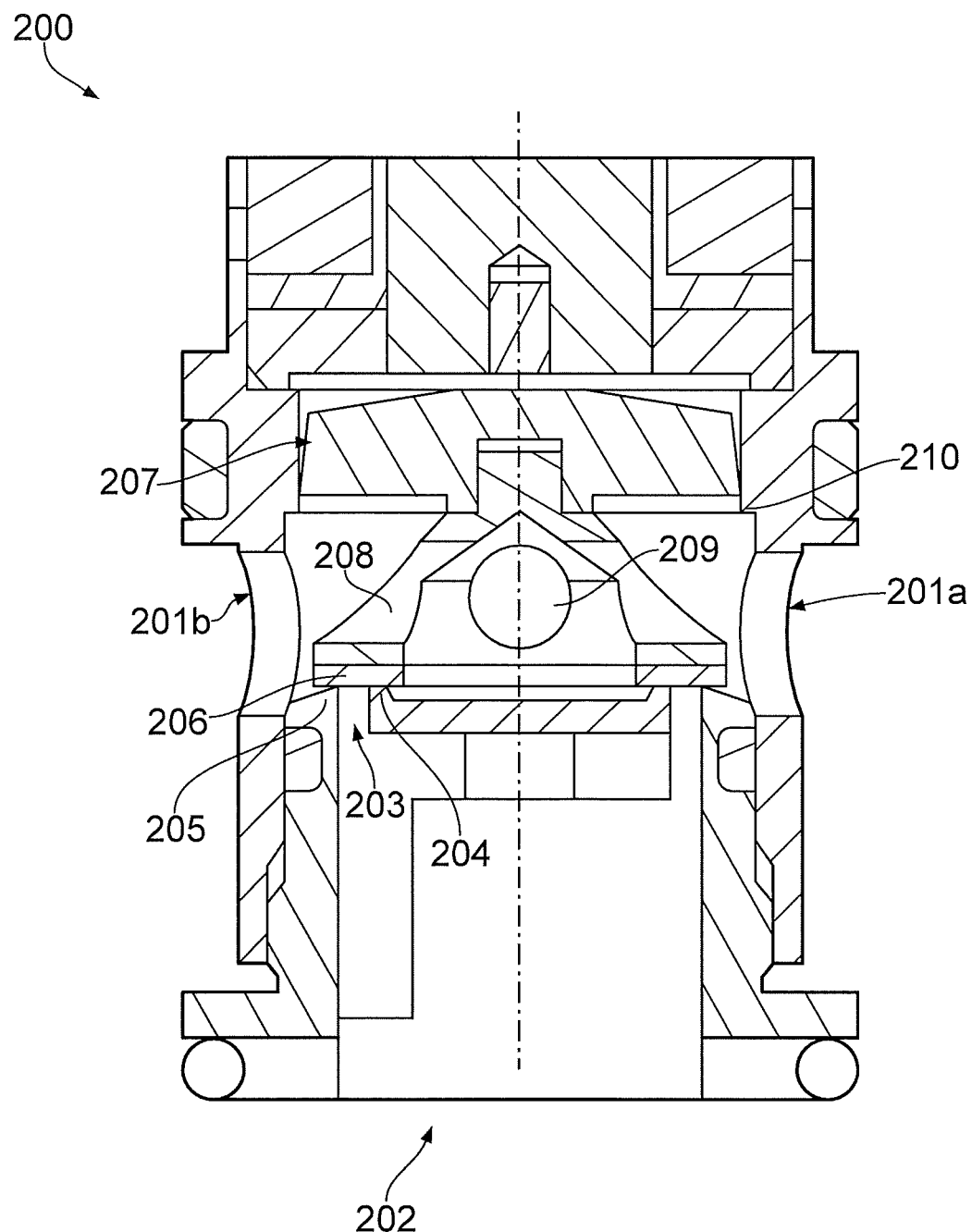
FIG. 6 shows an orthogonal cross-sectional view of a valve assembly in its closed position in accordance with the second embodiment of the present invention.

In FIGS. 4, 5 and 6, a valve assembly 200 according to a second embodiment of the present invention is shown, FIG. 6 being an isometric cross-sectional view, and FIGS. 5 and 6 being orthogonal cross-sectional views. FIGS. 4 and 6 show the valve assembly in its closed position; FIG. 5 shows the valve assembly in its open position. The diameter of the valve assembly 200 is, in preferred examples, about 16 mm.

The valve assembly 200 comprises a first fluid port 201a, a second fluid port 202 and a third fluid port 201b. In this embodiment, the first fluid port 201a and the third fluid port 201b are the fluid inlets and the second fluid port 202 is the fluid outlet. However, it will be appreciated that in other embodiments, the first fluid port and the third fluid port could be fluid outlets and the second fluid port could be a fluid inlet. The direction of fluid flow is shown by the arrows in FIG. 5. It can be seen from FIG. 7 that although there are three fluid ports in the second embodiment of the present invention, there are only two fluid pathways, and these will be described in further detail below.

The valve assembly 200 further comprises a valve seat 203 comprising an inner valve seat 204 and an outer valve seat 205 in a concentric arrangement, the inner valve seat 204 being arranged within the outer valve seat 205 and a valve seal 206. The assembly further comprises a moveable plunger 207 comprising an upper magnetic portion and a body 208 having an opening 209. A biasing means, preferably in the form of a spring 210 can also be provided, as can a moveable diaphragm 211.

The moveable plunger 207 is moveable between a closed position and an open position to vary a flow restriction at the valve seat, and is preferably arranged to simultaneously seal the inner valve seat 104 and the outer valve seat 105. Referring to FIG. 5, it can be seen that a largest diameter D2 of the moveable plunger 207 can be around 10.2 mm and a radial distance d2 between the inner valve seat 104 and the outer valve seat 205 can be around 0.8 mm. The stroke length of the moveable plunger 207 is, in preferred embodiments, about 0.2 mm.

A first fluid pathway $F_1$ is arranged between the first or third fluid ports 201a, 201b and the second fluid port 202, passing via the inner valve seat 204, (i.e. between the inner valve seat 204 and the valve seal 206) when the movable plunger 207 is in the open position. A second fluid pathway $F_2$ is arranged between the first or third fluid ports 201a, 201b and the second fluid port 202 passing via the outer valve seat 205 (i.e. between the outer valve seat 205 and the valve seal 206), when the movable plunger 207 is in the open position. Further, a fluid flow path through the body 208 of the moveable plunger 207 comprising the opening 209 is configured to form part of the first fluid pathway $F_1$. The cross-sectional area of the flow path through the moveable plunger 207, i.e. the minimum cross-sectional area, orthogonal to the flow direction, through which the fluid flow has to flow on the flow path through the moveable plunger 207, is at least approximately 50 times the cross-sectional area of the gap between the plunger and the inner valve seat 204 when the movable plunger 207 is in the open position. However, in other embodiments, this proportion may be as low as half of the cross-sectional area of the gap between the plunger and the inner valve seat 204. The flow path through the moveable plunger 207 is on the first fluid pathway $F_1$ of which the opening 109 forms a part.

As shown in FIG. 5, the depth G (or linear distance) of the gap between the plunger and the inner valve seat 204 of the second fluid pathway of which the opening 209 forms a flow path is substantially equal to the depth G (or linear distance) of the gap between the plunger and the outer valve seat 205 of the first fluid pathway of which the opening 209 does not form a flow path. In other words, the moveable plunger 207 seals the inner and outer valve seats 204, 205 across a single plane.

In the open position shown in FIG. 5, fluid enters the valve assembly 200 through the first fluid port 201a and the third fluid port 201b and is able to flow via two paths. The second fluid pathway $F_2$ directly connects the first and third fluid ports 201a, 201b and the second fluid port 202, and the first fluid pathway $F_1$, of which a fluid flow path or opening 209 through the body 208 of the moveable plunger 207 forms a part, also connects the first and third fluid ports 2011, 201b and the second fluid port 202. The first fluid pathway and the second fluid pathway, in preferred embodiments, are the only fluid pathways between the first and third fluid ports 201a, 201b and the second fluid port 202 when the movable plunger is in the open position.

In this embodiment, when the moveable plunger 207 is in the closed position, as shown in FIGS. 4 and 6, fluid from the first and third fluid ports 201a, 201b can extend through the fluid flow path or opening 209 through the body 208 of the moveable plunger 207 and reaches the outer edge of the inner valve seat 204 where it is prevented from passing through by the valve seal 206 created by the moveable plunger 207. Fluid from the second fluid port 202 can reach the outer edge of the outer valve seat 205 where it is prevented from passing through by the valve seal 206 created by the moveable plunger 207. In this embodiment, the valve seal 206 is a seal made of a compliant material such as rubber, although any suitable sealant material can be used, be it of a compliant nature or not.

In the electrically actuated solenoid valve of FIGS. 4, 5, and 6, an upper portion of the moveable plunger 207 is made of a magnetic material. Thus, when an electric current is applied through the solenoid, the solenoid is energised, and the magnetic field that is created as a result controls the movement of the magnetic moveable plunger 107 that opens and closes the valve, thus allowing or preventing fluid from flowing through the valve. When the solenoid is energised, the plunger may overcome the force of the spring 210 that holds the plunger in a normally closed position and be accelerated away from the valve seat 203. It will be appreciated that in other embodiments, the valve assembly may be a normally open valve assembly and so energisation of the solenoid causes the plunger to overcome the force of the spring that holds the plunger in a normally open position such that it is accelerated towards the valve seat. In this embodiment, the spring 210 is a flat spring, although other biasing means may be employed to provide the function of the spring described above.

Figure 7:
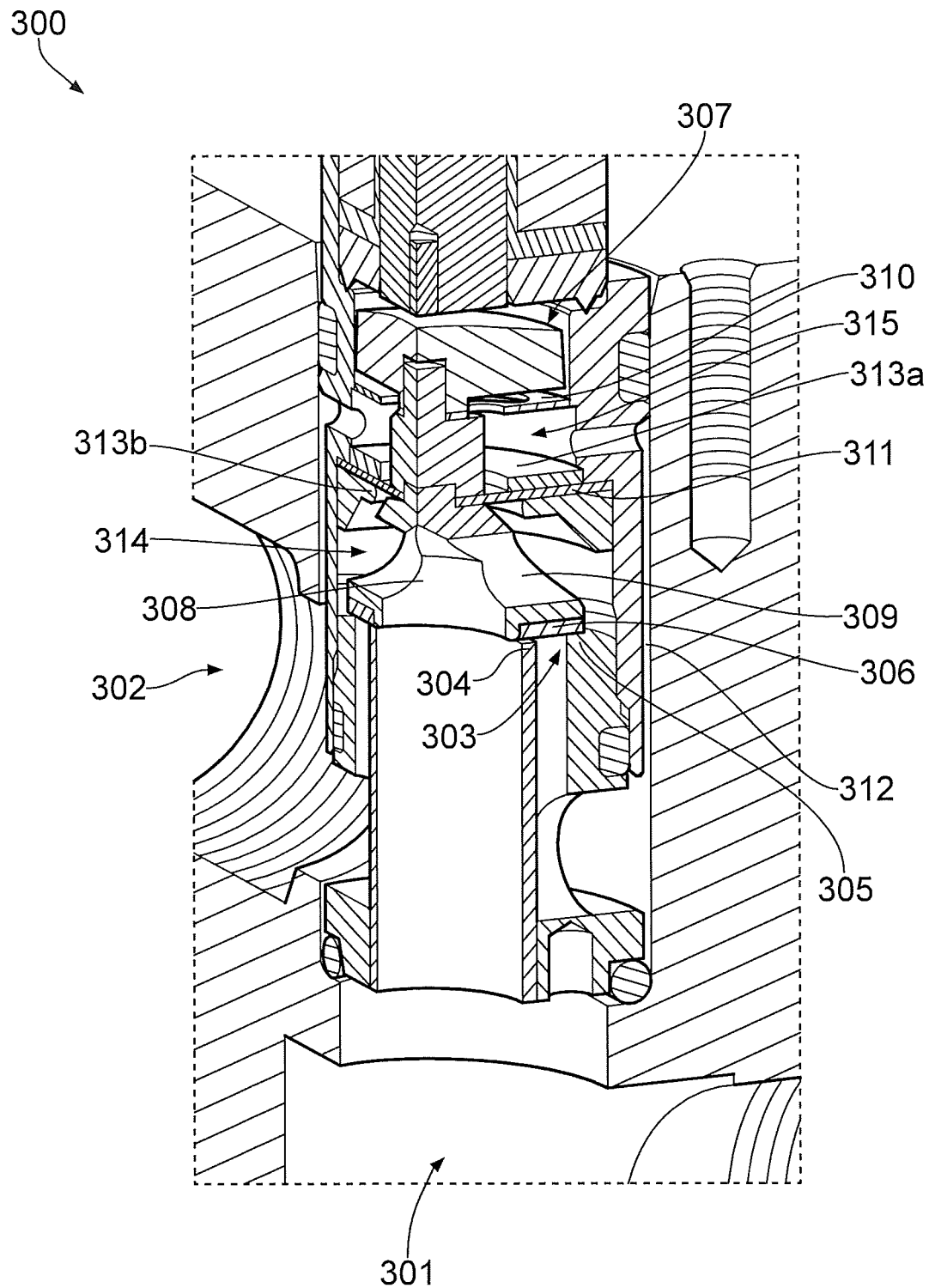
FIG. 7 shows a schematic view of a valve assembly in accordance with a third embodiment of the present invention.

In FIG. 7, a schematic (upright) sectional view of a valve assembly 300 in its closed position according to a third embodiment of the present invention is shown.

The valve assembly 300 comprises a first fluid port 301 and a second fluid port 302. In this embodiment, the first fluid port 301 is the fluid inlet and the second fluid port 302 is the fluid outlet. However, it will be appreciated that in other embodiments, the first fluid port could be the fluid outlet and the second fluid port could be the fluid inlet.

The valve assembly 300 further comprises a valve seat 303 comprising an inner valve seat 304 and an outer valve seat 305 in a concentric arrangement, the inner valve seat 304 being arranged within the outer valve seat 305 and a valve seal 306. The assembly further comprises a moveable plunger 307 comprising an upper magnetic portion and a body 308 having an opening 309 (not visible in the schematic view of FIG. 7). A biasing means, preferably in the form of a spring 310 can also be provided, as can a moveable diaphragm 311, a pressure equalising fluid pathway 312, an upper shim 313a and a lower shim 313b.

The pressure equalising fluid pathway 312 is a pressure compensation means for ensuring that the fluid inlet and a portion of the moveable plunger that is not in a direct flow path between the first and second fluid ports are under substantially the same pressure when the moveable plunger is in the closed position. In other words, fluid flow between the first and second fluid ports is prevented in this portion of the moveable plunger. Advantageously, this means that the moveable plunger may be kept from moving to its open position unintentionally.

The pressure equalising fluid pathway 312 extends from the second fluid port 302, the fluid inlet in this case, to a portion of the moveable plunger that is not in a direct flow path between the first fluid port 301 and the second fluid port 302. In other embodiments, the pressure equalising fluid pathway can extend from the first fluid port to a portion of the moveable plunger that is not in a direct flow path between the first fluid port and the second fluid port.

The upper shim 313a is for varying the area of the moveable diaphragm 311 that can be biased by pressure from the first fluid port 301. Pressure within a valve chamber 314 can cause the moveable diaphragm 311 to be biased outwardly from the valve chamber 314. Varying the inner diameter of the opening in the upper shim 313a can therefore vary the amount of biasing of the moveable diaphragm 311 outwardly from the valve chamber 314.

The lower shim 313b is for varying the area of the moveable diaphragm 311 that can be biased by pressure from the second fluid port 302. Pressure within the pressure compensating chamber 315 can cause the moveable diaphragm 311 to be biased outwardly from the pressure compensating chamber 315. Varying the inner diameter of the opening in the lower shim 313b can therefore vary the amount of biasing of the moveable diaphragm 311 outwardly from the pressure compensating chamber 315.

Thus, different diameters of the upper shim 313a and lower shim 313b can vary the amount of pressure exerted by the valve chamber 314 and the pressure compensating chamber 315 upon the moveable diaphragm, respectively.

The upwards pressure on the valve seal 306 is compensated by the downwards pressure on the moveable plunger 307 from the fluid inlet via the pressure equalising fluid pathway 312. This advantageously provides a flexible approach to varying the pressure that is exerted on the portion of the moveable plunger 307 that is not in a direct flow path between the first and second fluid ports 301, 302.

Figure 8:
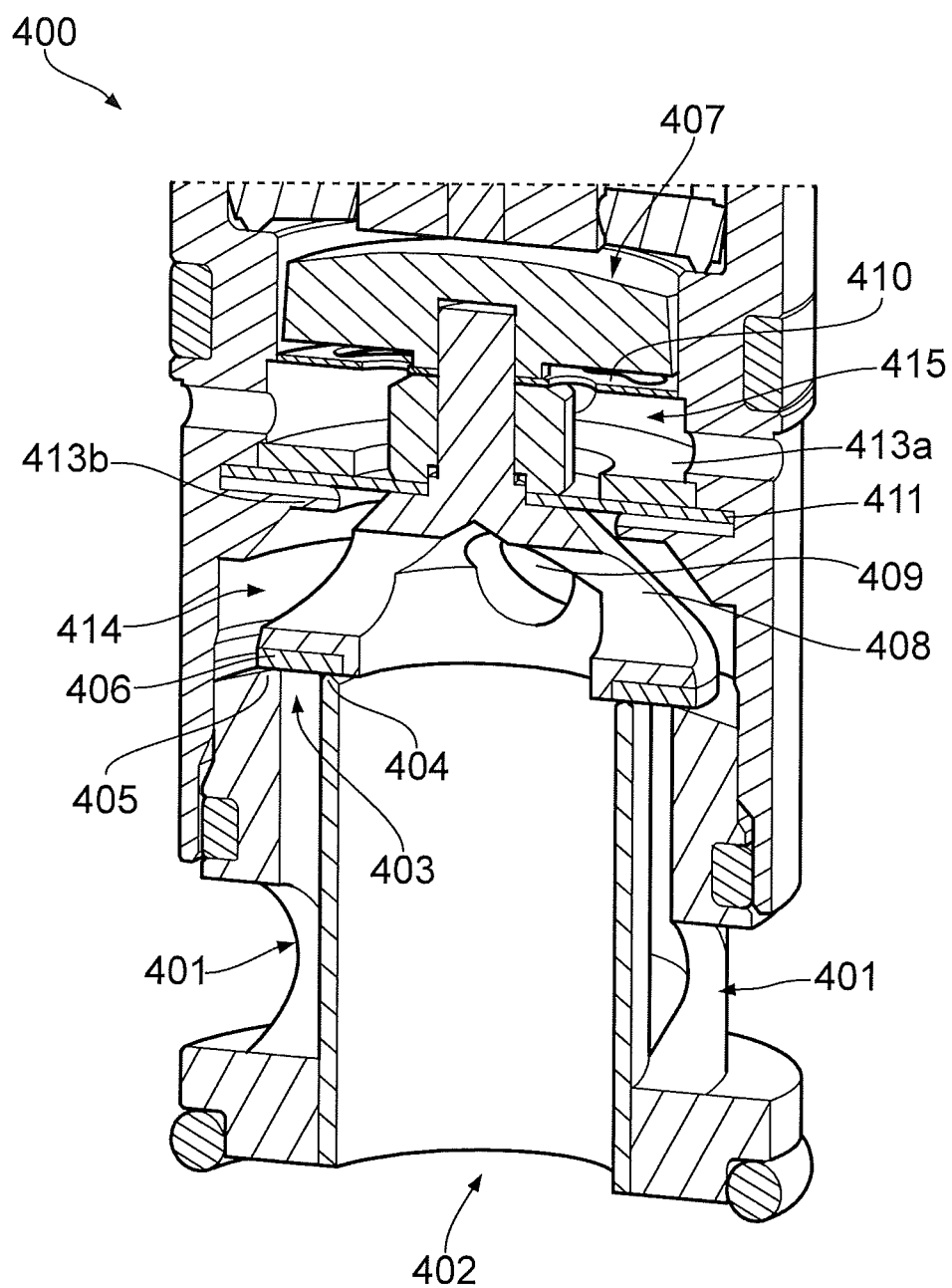
FIG. 8 shows a schematic view of a valve assembly in accordance with a fourth embodiment of the present invention.

In FIG. 8, a schematic (upright) view of valve assembly 400 in its closed position according to a fourth embodiment of the present invention is shown.

The valve assembly 400 comprises a first fluid port 401 and a second fluid port 402. In this embodiment, the first fluid port 401 is the fluid inlet and the second fluid port 402 is the fluid outlet. However, it will be appreciated that in other embodiments, the first fluid port could be the fluid outlet and the second fluid port could be the fluid inlet.

The valve assembly 400 further comprises a valve seat 403 comprising an inner valve seat 404 and an outer valve seat 405 in a concentric arrangement, the inner valve seat 404 being arranged within the outer valve seat 405 and a valve seal 406. The assembly further comprises a moveable plunger 407 comprising an upper magnetic portion and a body 408 having an opening 409. A biasing means, preferably in the form of a spring 410 can also be provided, as can a moveable diaphragm 411, a pressure equalising fluid pathway (not visible in the schematic view of FIG. 8), an upper shim 413a and a lower shim 413b.

As with the third embodiment described above in relation to FIG. 7, the pressure equalising fluid pathway is a pressure compensation means for ensuring that the fluid inlet and a portion of the moveable plunger that is not in a direct flow path between the first and second fluid ports are under substantially the same pressure when the moveable plunger is in the closed position. It extends from the first fluid port 401, the fluid inlet in this case, to a portion of the moveable plunger that is not in a direct flow path between the first fluid port 401 and the second fluid port 402.

The upper shim 413a is for varying the area of the moveable diaphragm 411 that can be biased by pressure from the first fluid port 301. Pressure within the valve chamber 414 can cause the moveable diaphragm 411 to be biased outwardly from the valve chamber 414. Varying the inner diameter of the opening in the upper shim 413a can therefore vary the amount of biasing of the moveable diaphragm 411 outwardly from the valve chamber 414.

The lower shim 413b is for varying the area of the moveable diaphragm 411 that can be biased by pressure from the second fluid port 402. Pressure within the pressure compensating chamber 315 can cause the moveable diaphragm 411 to be biased outwardly from a pressure compensating chamber 415. Varying the inner diameter of the opening in the upper shim 413b can therefore vary the amount of biasing of the moveable diaphragm 411 outwardly from the pressure compensating chamber 415.

Thus, different diameters of the upper shim 413a and lower shim 413b can vary the amount of pressure exerted by the valve chamber 414 and the pressure compensating chamber 415 upon the moveable diaphragm, respectively.

The upwards pressure on the valve seal 406 is compensated by the downwards pressure on the moveable plunger 407 from the fluid inlet via the pressure equalising fluid pathway. This advantageously provides a flexible approach to varying the pressure that is exerted on the portion of the moveable plunger 407 that is not in a direct flow path between the first and second fluid ports 401, 402.

The need to provide concentric orifices, in particular in a small valve assembly, presents new manufacturing challenges. Providing suitable fluid flow paths, both between the concentric valve seats and within or outside of them, presents a particular challenge from a manufacturing and assembly perspective, and this challenge is accentuated in microfluidic valves. Accessing small flow channels to manufacture them by moulding or by material removal processes, such as machining, can be challenging, if not impossible. Further, assuring the correct tolerances are adhered to in order to assure consistent flow characteristics of the valve is also a challenge. In past examples of valves comprising concentric orifices, generally a single part has been manufactured from a single piece of material in which the two valve seats are created on the same component, and it is the moulding or machining process which creates them at their designed positions. Particularly for the microfluidic implementation, such as in valves in which a diameter of the valve seats is less than around 1 cm or less than around 2 cm, the inventors have been required to devise a new method of manufacture and assembly of the required concentric orifices, as explained in more detail in the following.

Figure 9:
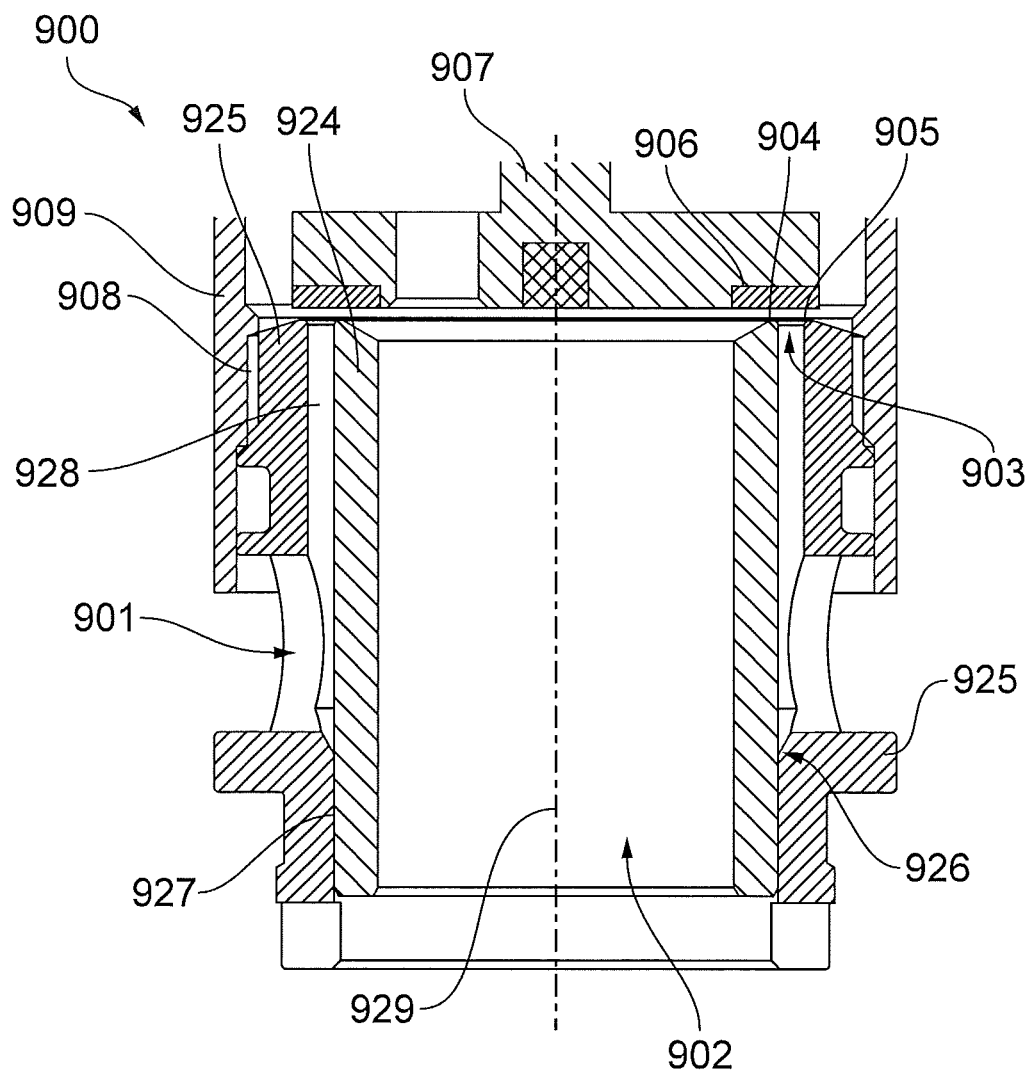
FIG. 9 shows an orthogonal cross-sectional view of a valve assembly in its open position in accordance with a fifth embodiment of the present invention.

With reference to FIG. 9, an embodiment of a valve with a two-part concentric valve assembly 900 is illustrated. It will be appreciated that many of the features are equivalent to those of the preceding valves and as such the functionality of the valves will be similar. Corresponding features are generally given corresponding reference numerals, with the first digit amended to correspond to the Figure number in question. It will therefore be appreciated that the features described in relation to the valve seat assemblies discussed in the following can equally be implemented in any of the earlier embodiments, and vice-versa.

The inventors have devised a two-part assembly which comprises an inner valve member 924 and an outer valve member 925, which are two separate components of the assembly. The inner valve member 924 is provided with an inner valve seat 904, while the outer valve member is provided with an outer valve seat 905. The inner valve member 924 is arranged concentrically within the outer valve member 925. By suitable assembly and alignment of the inner valve member 924 within the outer valve member 925, the required alignment between the inner valve seat 904 and the outer valve seat 905 can be created. An important aspect of concentric seat valve arrangements, such as those described herein, is that the plunger 907 and its corresponding seal 906 are able to seal both the inner valve seat 904 and the outer valve seat 905 simultaneously. In arrangements where the inner 904 and outer 905 valve seats are coplanar, they can both be sealed at the same time with a substantially planar valve seal 906. This arrangement can be one of the simplest to implement. However, it is also possible to have the inner 904 and outer 905 valve seats arranged in different planes, as long as the seal 906 comprises a suitable form such that it is configured to contact the inner valve seat 904 in a first plane, and the outer valve seat 905 in a second plane, simultaneously, to simultaneously seal the two seats. As such, embodiments can be envisaged in which the inner valve seat 904 and the outer valve seat 905 are not coplanar. Considering this alternative in relation to FIG. 9, in which the inner and outer valve seats are coplanar, in a non-coplanar arrangement, the inner valve seat 904 may be held at a higher or lower position than the outer valve seat 905 so long as a suitable profile is created on the plunger and/or its seal 906 to provide a sealing face at a suitable height in the arrangement, the 'height' corresponding to an axial location along an axis 929.

It is therefore important for the correct functioning of the valve that the inner valve member 924 is held at a correct axial position along the axis 929, relative to the outer valve member 925. Arrangements according to the embodiments described herein provide an axial alignment means to ensure the correct axial alignment of the inner 924 and outer 925 valve members, to in turn provide correct axial alignment to the inner 904 and outer 905 valve seats.

In the arrangement shown in FIG. 9, the axial alignment means are provided at an interface 927 between the inner 924 and outer 925 valve members. A mechanical fixation is provided at this interface in this embodiment. Such a mechanical fixation could include any of: an interference fit, a threaded engagement, or a welded, bonded or glued interface. There are potential draw backs to threaded engagements, in that they may come loose and thus lose the correct alignment of the valve seats 904 and 905 along the axis 929. Using bonding or gluing substances can result in a risk of contamination of the fluids flowing through the valve assembly. Use of an interference fit can avoid these drawbacks and so is preferred in certain embodiments. Methods of assembly of the valve can therefore include a provision of the inner 924 and outer 925 valve members comprising the inner 904 and outer 905 concentric valve seats as described in relation to the above. The methods may further comprise aligning the inner 924 and outer 925 valve members and fixing them in their relative axial position along the axis 929 with any of the above described mechanical fixing means. Accordingly, axial alignment means can be provided for such a valve arrangement at the interface 927. In order to provide such means, in the embodiment of FIG. 9, a reduction in a radial dimension of the inner bore of the outer valve member 925 is provided, as can be seen at a sloped surface indicated at 926. Therefore, radial alignment means can be provided in which a reduction of the inner diameter of the bore of the outer component 925 is provided. Other embodiments can be envisaged in which the reduction in a radial dimension of the inner bore of the outer member 925 only occurs at certain locations. However, this will not result in a fluid seal. Therefore, an advantage of providing the reduction in the inner diameter around the circumference of the bore of the outer component 925 is that a combination of a fluidic seal between the inner 924 and outer 925 valve members, and an axial alignment means is provided by a single feature, which results in an efficient assembly and lowered manufacturing cost.

A further important aspect of the assembly is the provision of the required degree of concentricity between the inner 904 and outer 905 valve seats. The radial alignment means 926 described in relation to the embodiments of the valves described herein can also provide this function of assuring the concentricity of the valve seats. The radial alignment means can therefore be provided by a reduction in a radial dimension of the outer valve member 925, and such a feature can also provide for an axial alignment means 927 which combine to provide a fluidic seal at a suitable point between the inner 924 and outer 925 valve members.

As can be seen in the figure, an annular flow channel 928 can be created between a first, side port 901 of the valve and the inner 904 and outer 905 valve seats. The side port 901 can be provided between the axial 927 and radial 926 alignment means, while the seal created by the axial alignment feature 927 creates a separation between the first, side port 901 and the second, end port 902 of the valve. As can be seen, the outer valve member 925 can be fixed within a valve body 909 by further fixation means such as a threaded engagement. This is one example of a mechanical engagement means which can be provided to connect these two components but others can be envisaged in the same manner as described above in relation to interface 927.

In a number of the presently described embodiments, such as in FIG. 9, the inner valve member is a substantially tubular member, extending from the inner valve seat toward an end port 902 of the valve assembly. The outer valve member may also be a substantially tubular member, extending from the outer valve seat 905 toward the side and/or end port(s) of the valve assembly. Use of a tubular inner valve member can efficiently create a flow path from the inner valve seat to a port of the valve assembly. Providing a tubular outer valve member around the inner valve member can efficiently provide a substantially annular flow path away from the inner and outer valve seats toward a port of the valve. The opposing radial faces of the inner and outer tubular valve members can then efficiently be used to create or accommodate the axial and radial alignment means to align the valve seats with one another both radially and axially. Other embodiments than FIG. 9 shown herein also have similar arrangements of substantially tubular inner and/or outer valve members.

FIGS. 10A, 10B, and 10C show an alternative embodiment. While in FIG. 9, first, side port 901 was provided in fluid communication with the annular flow channel 928, in this embodiment of FIGS. 10A, 10B, and 10C, the annular flow channel 1028 is instead in fluid communication with an end port or second port 1009 of the valve assembly 1000. As will be appreciated in the arrangement of FIG. 9, and that of FIGS. 10A to 10C onwards, some features are equivalent to those presented in the FIGS. 1 to 8 of the embodiments described above and as such all features described in relation to those earlier figures can be combined with embodiments as described in relation to FIG. 9 onwards, in any desired combination. The functioning of the embodiments shown in FIGS. 10A, 10B, and 10C is similar to that shown in FIG. 9 in that the plunger and its optional seal 1006 can be brought into contact with an inner 1004 and an outer 1005 concentric valve seats to control a flow restriction through a flow path through the valve. In this embodiment, the inner valve member 1024 is mechanically attached to the separate outer valve member 1025 via an interface 1027. There is again a mechanical fixation at this interface. As with FIG. 9, this interface may comprise an interference fit, a bonded or welded pair of surfaces, or a threaded engagement arrangement. In this embodiment, an outer edge of the outer valve seat 1005 and an inner edge of the inner valve seat 1004 are both in fluid communication with the first, side port 1001 of the valve. The inner valve member 1024 comprises a barrier 1030 for preventing fluid flow between the side port 1001 and an end port 1002. In this embodiment, the barrier is provided in the form of a substantially planar disc, but other forms may be envisaged. The barrier 1030 of the inner valve member 1024 is held in position on a pair of mounts 1031 and 1032. In this embodiment, the mounts are provided in the form of legs 1031 and 1032 as illustrated in FIG. 10C. These features are mechanically engaged with the inner surfaces 1034 and 1033 of the outer valve member 1025. As can be seen in FIGS. 10A and 10B, the mechanical fixation at interface 1027 between the inner member 1024 and outer member 1025 can provide axial alignment of the inner 1004 and outer 1005 valve seats at the desired relative axial positions. Radial alignment means 1026 are also provided, in this case, in the form of a reduction in the radial dimension of the inner bore of the outer valve member 1025 at a suitable point to provide contact with the mounts 1031 and/or 1032. This radial alignment means helps to assure the concentricity of the inner and outer valve seats 1004 and 1005. In the illustrated embodiment, the reduction in the radial dimension is provided around only a portion of the circumference of the outer valve member 1025, but embodiments can be envisaged in which the reduction in radial dimension is provided around the full circumference, which would allow the mounts 1031 and 1032 to engage the surface at any circumferential position within the outer valve member 1025.

A further mechanical interface 1008 is provided in this embodiment between the outer valve member 1025 and the valve body 1009. In both the embodiment of FIG. 9 (interface 908) and in the embodiments of FIGS. 10A and B (interface 1008), the axial positioning of the valve seats relative to the valve body 909/1009 can be adjusted to vary the performance of the valve. Such an interface can be provided as a thread engagement, or other adjustable mechanical engagement, to allow variation of the axial alignment of the inner and outer valve seats relative to the valve body 909/1009. This can in turn adjust the opening of the valve in its open state which will affect flow performance factors such as opening and closing time and maximum flow at full opening.

Figure 11:
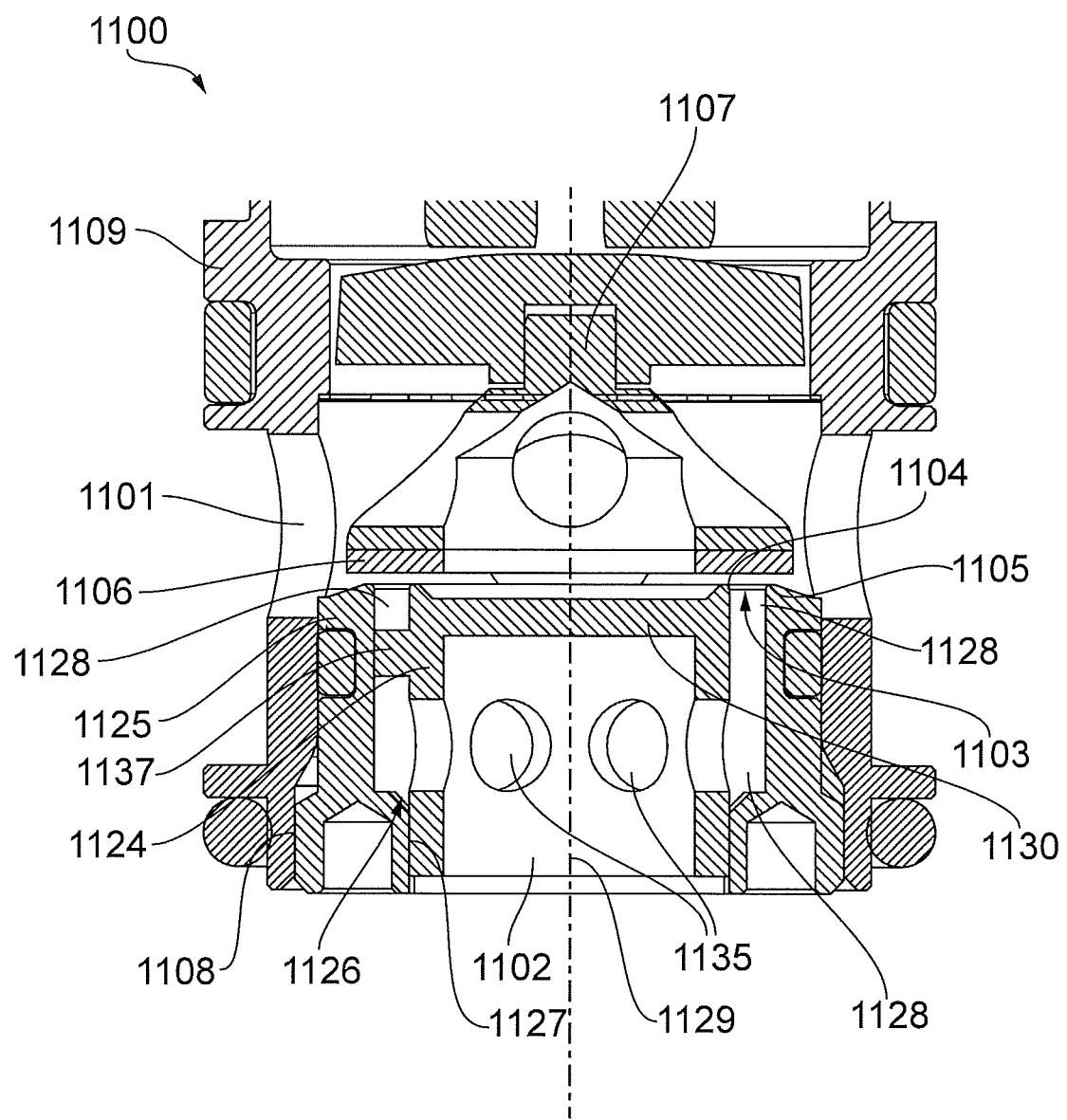
FIG. 11 shows an orthogonal cross-sectional view of a valve assembly in its open position in accordance with a seventh embodiment of the present invention.

FIG. 11 shows a further alternative arrangement in which a barrier member 1130 is provided on the inner valve member 1124. In this arrangement, a second, end port, 1102 is in fluid communication with the annular flow channel 1128 provided between the inner valve member 1124 and outer valve member 1125. In this embodiment, the inner member is of substantially tubular form, as it is in FIG. 9. Differently from FIG. 9, the barrier 1130 is provided, to prevent fluid flow between the inner edge of the inner seat and the second, end port 1102 when the valve is in the closed position. At least one lateral fluid flow passage 1135 is provided in the inner valve member, to allow fluid communication between the end port 1102 and the annular flow channel 1128. A number of features of this assembly function in the same manner as that of FIG. 9 and equivalent features are given equivalent reference numerals, with their leading digits changed to match the figure number, to further illustrate this equivalence.

The axial alignment means 1126 shown in FIG. 11 are provided in the same manner as the feature 926 provided in FIG. 9. This provides axial alignment between the inner valve member 1124 and the outer valve member 1125. An interface 1108 can, similarly to the interfaces 908 and 1008 described earlier, allow axial alignment of both inner 1104 and outer 1105 valve seats relative to a valve body 1109 and a plunger 1107 to adjust the performance or behaviour of the valve. Supplementary radial alignment means can be provided in the form of one or more projections 1137, which may project radially from an outer surface of the inner valve member 1124 at one or more locations. This can help to align the inner valve member 1124 relative to the outer valve member 1125 at one or more additional axial positions along axis 1129. Therefore, in the assembly of FIG. 11, axial alignment means 1127 can be provided in the same manner as described in relation to FIG. 9 above and may be supplemented by additional axial alignment means 1137. Radial alignment means 1126 are provided in the same manner as described in relation to the radial alignment means 926 described in FIG. 9 above. Further, as in the above embodiments, the plunger and its optional seal 1106 can be used to seal the inner 1104 and outer 1105 valve seats when the valve is in the closed position.

With reference to FIG. 2 already described earlier in this description, a further alternative arrangement of radial alignment means and axial alignment means can be described. As with other embodiments, an inner valve member 124 and an outer valve member 125 are each provided with the respective inner 104 and outer 105 valve seats. On the inner valve member 124, a radial projection 160 is provided, and may be provided alongside one, two or a greater plurality of projections 160, which project from an outer surface of the inner valve member 124 to contact an inner surface 170 of the bore of the valve assembly 100.

In this arrangement, a mechanical connection between the inner 124 and outer 125 valve members is provided at an interface 127. This interface can be configured in the same manner as described above in relation to interface 927 or 1027 to provide axial alignment means by way of a mechanical connection in between the inner 124 and outer 125 valve members. The axial alignment can also be complemented by axially abutting surfaces 140. The axially abutting surfaces 140 in the illustrated embodiments are substantially orthogonally arranged with respect to an axis 129 of the valve. However, any pair of abutting surfaces which may not necessarily be orthogonal and may be provided at an incline can provide this abutting complement to the axial alignment function to provide improved axial alignment means between the inner 124 and outer 125 valve members.

In this embodiment, an interface 150 between the outer valve member 125 and the valve body 108 may be a clearance fit, which results in the primary axial position of the concentric valve seats 104 and 105 relative to the valve body 108 and plunger 107 being provided via an interface 151.

The interface 151 can be provided in the same way as described above in relation to the interfaces 927 and 1027 or may alternatively be provided as a threaded mechanical fixation, as described above in relation to interfaces 908 and 1008. Therefore, in the embodiment of FIG. 2, axial alignment means between the first and second valve members may be provided by the mechanical interface 127 as in the other embodiments, while optionally being further aligned with a pair of the complementary axially abutting surfaces 140. Radial alignment means can be provided in the form of one or more projections 160, optionally having a step arranged to engage the outer valve member 125, to provide radial alignment between the inner 124 and outer 125 valve members and their respective inner 104 and outer 105 valve seats.

Figure 12:
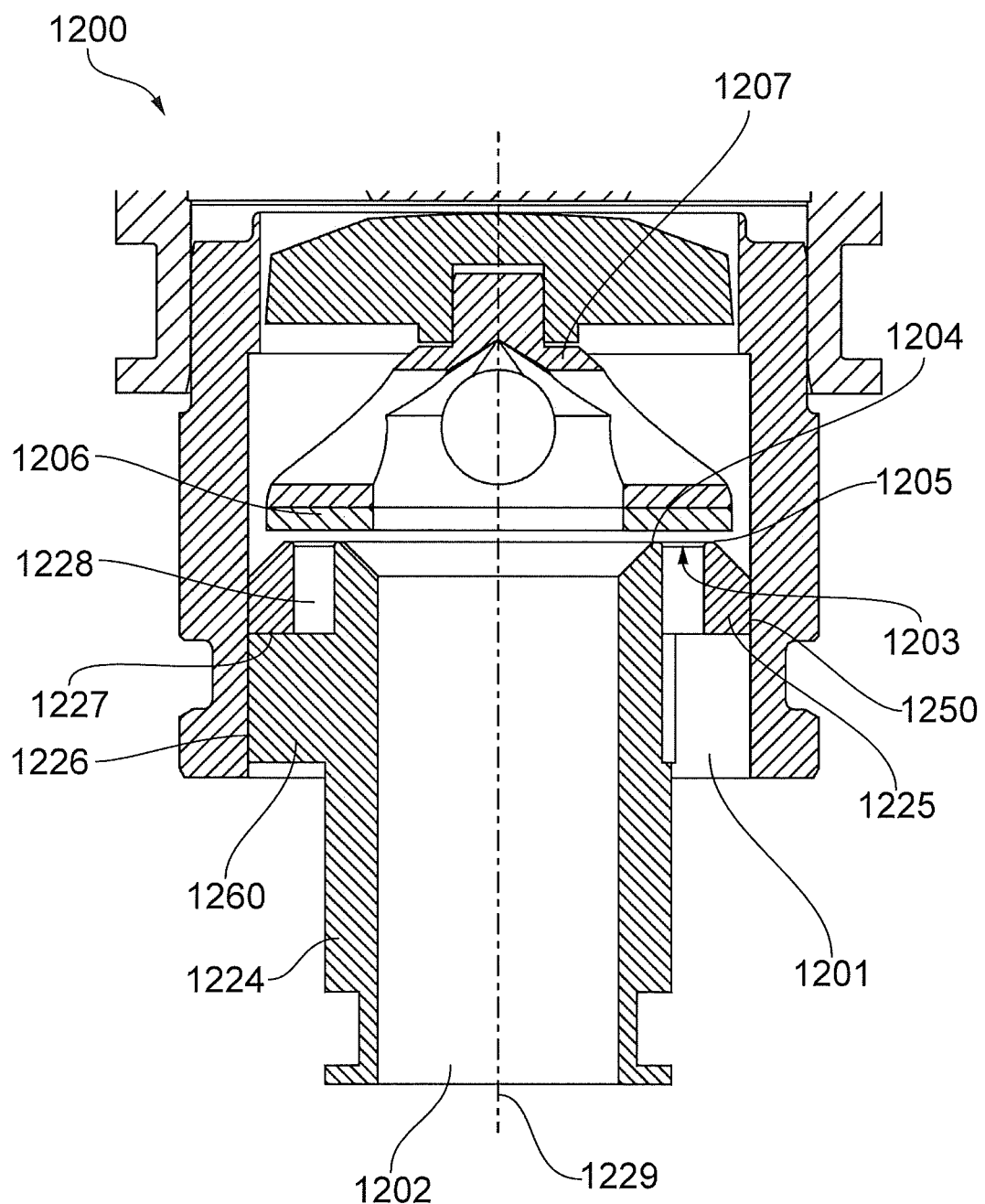
FIG. 12 shows an orthogonal cross-sectional view of a valve assembly in its open position in accordance with an eighth embodiment of the present invention.

FIG. 12 shows an alternative arrangement, which is similar to that shown in FIG. 2 described above. However, in this arrangement the interface 1250 is a mechanical fixation which can be provided in the same form as the interfaces 927 and 1027 above, such as via welding, gluing or bonding, by thread means, or by an interference fit. An interface 1226 is also provided with a fixed mechanical interface in the same manner. The interface 1226 is provided between one or more projections 1260 which is provided on the inner member 1224 in a similar manner to that described for projections 160 of FIG. 2. An axially abutting pair of surfaces 1227 is provided in the alignment means of FIG. 12, which can further assist with axial alignment of the inner 1224 and outer 1225 valve members, in a similar manner to the interface 140 described in relation to FIG. 2. Functioning of the embodiment in FIG. 12 is otherwise as described in relation to the earlier figures and similar reference numerals, but suffixed with a 12 rather than the earlier figure numbers, are used for similar features.

Figure 13:
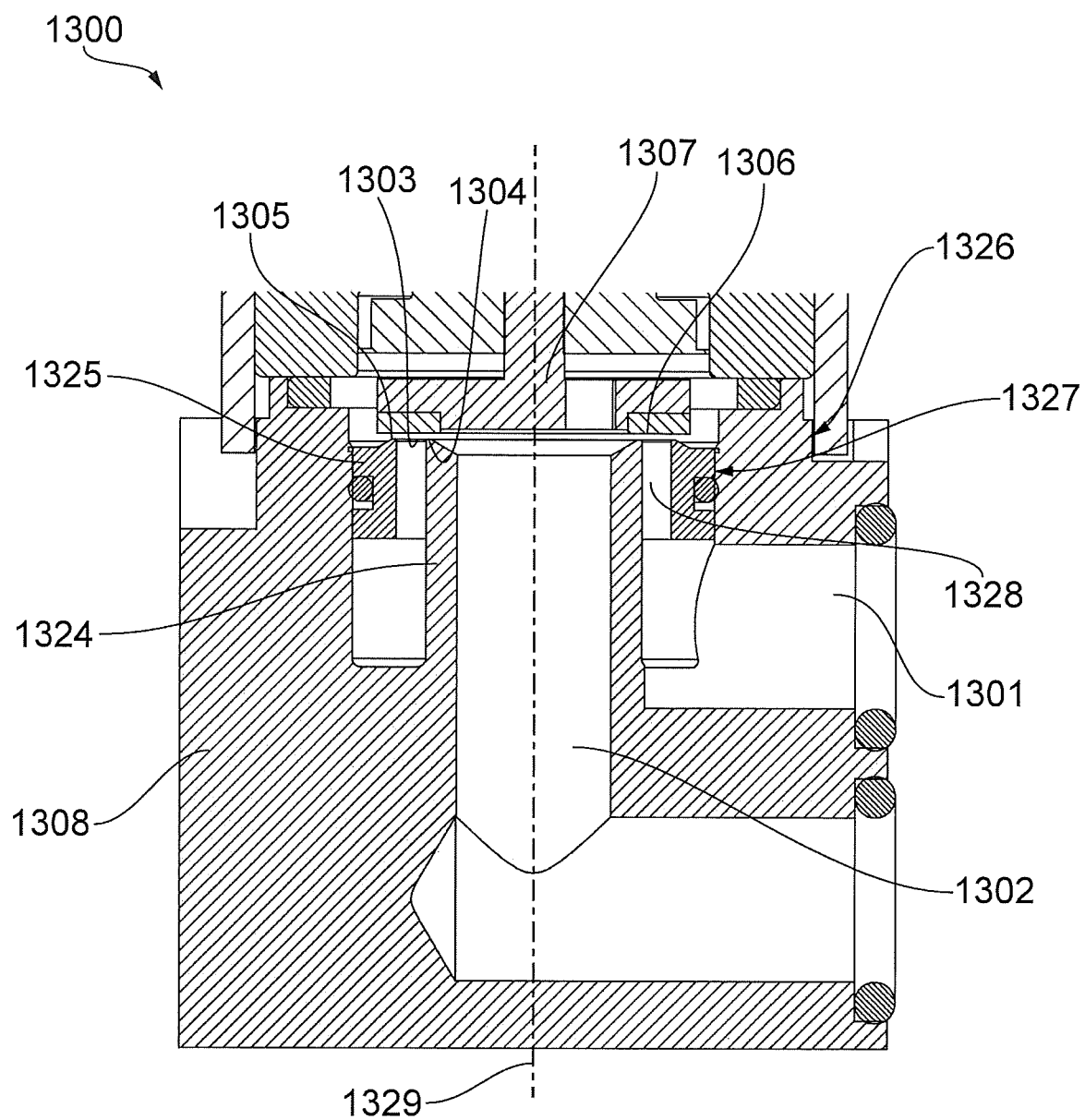
FIG. 13 shows an orthogonal cross-sectional view of a valve assembly in its open position in accordance with a ninth embodiment of the present invention.

FIG. 13 shows a further alternative assembly 1300 in which an inner valve member 1324 is integrally formed with a valve body 1308 and so the valve body 1308 and the inner valve member 1324 are combined in one single piece. In other embodiments, the outer valve member of the assembly may be combined with the valve body in a single piece. A first port 1301 and a second port 1302 are formed in the valve body 1308. The valve functions in a similar manner to the embodiments described earlier in this description, the first port 1301 being in fluid communication with an annular flow channel 1328 formed between the inner valve member 1324 and an outer 1325 valve member. The outer valve member 1325 is maintained in both concentric alignment and axial alignment via an interface 1327 which can be configured as per the interfaces 927 and 1027, for example, in the earlier embodiments. This radial alignment means can also provide a double function as an axial alignment means by providing a mechanical fixation between the opposing faces at the interface 1327. The interface 1327 can also provide a supplementary function as a fluid seal and may be supplemented by the illustrated o-ring seal as necessary.

The inventors have also devised a method of assembling a valve assembly. The method comprises a number of steps in order to assemble the assemblies described above. The steps include providing an inner valve member comprising an inner concentric valve seat and providing an outer valve member comprising an outer concentric valve seat. Further steps include arranging the inner valve member so as to position the inner concentric valve seat radially inward of the outer concentric valve seat to provide an annular flow opening between them. A further step is that of radially aligning the inner concentric valve seat relative to the outer concentric valve seat to maintain concentricity between those two components. A further step is that of axially aligning the inner concentric valve seat relative to the outer concentric valve seat along an axis of the valve. The axis is one which is substantially orthogonal to a plane or planes of the concentric valve seats. A further step is that of providing a radial alignment means to maintain concentricity of the inner concentric valve seat relative to the outer concentric valve seat. The radial alignment means is part of the valve assembly. A further step is that of providing an axial alignment means to maintain axial alignment of the inner concentric valve seat relative to the outer concentric valve seat along an axis. The axial alignment means is a part of the assembly as well. The inner valve member is a separate component from the outer valve member and is mounted in fixed relation to the outer valve member via mounting means comprising the axial and radial alignment means. Further steps to complete the valve assembly may include providing a moveable plunger, being moveable between a closed position and an open position to vary a flow restriction at the valve seat, and arranged to simultaneously seal the inner concentric valve seat and the outer concentric valve seat when in the closed position. A further step is that of aligning the moveable plunger relative to the concentric valve seats such that the moveable plunger simultaneously seals the inner concentric valve seat and the outer concentric valve seat when in the closed position.

The step of axially and radially aligning the inner concentric valve seat relative to the outer concentric valve seat may comprise a step of positioning the inner or outer concentric valve seat on a flat, rigid surface. The surface may comprise marble, but other surfaces with appropriate properties of flatness and hardness can be envisaged for this step, such as other stone materials or hard metals, etc. The method may further comprise fitting the inner valve member into the outer valve member, or the outer valve member to the inner valve member. This may be achieved by press-fitting, but other methods of fitting can be envisaged. By press-fitting, for example, the inner valve member into the outer valve member, while the outer valve seat is in direct contact with the flat surface, it will be appreciated that axial alignment of the concentric valve seats can be achieved, by pressing until both valve seats abut the surface. Furthermore, it can be appreciated that this method can achieve co-planar valve seats, as required by some of the embodiments described above. Such a fit can be sufficient in fulfilling the requirements that the valve seats are concentric and axially aligned, such as in a coplanar manner. Therefore, it can be appreciated that no other fastening means may be necessary, resulting in an efficient and low-cost connection between the two parts. However, other fastening means may still be provided in order to supplement the fit described above if desired.

Alternatively, the step of arranging the inner and outer valve members may be performed such that the concentric valve seats are not coplanar. It can be appreciated that this arrangement could also be achieved by press-fitting. Rather than using an entirely flat surface, a stepped surface could be used. For example, a lower surface with a flat, circular step could be provided, the step having smaller dimensions than the diameter of the outer concentric valve seat in the plane thereof. The outer valve member can be positioned on the surface, such that the outer concentric valve seat surrounds the step. Then, the inner valve member may be press-fitted into the bore of the outer valve member. The step provided inside such a bore would limit the distance through which the inner valve member could be fitted, resulting in a valve seat arrangement that is not co-planar. By providing one part of the surface at a first height to support one of the inner and outer valve seats during assembly, and providing a second part of the surface at a second height to support the other of the inner and outer valve seats during assembly, can therefore provide effective means of assembling the inner and outer valve members at a desired axial alignment. Where the first height is the same as the second height a coplanar seat arrangement can be achieved. When the first height is different from the second height, a non-coplanar seat arrangement can be provided.

The above description relates to a number of particularly preferred aspects of the invention, but it will be appreciated that other implementations are possible. Variations and modifications will be apparent to the skilled person, such as equivalent and other features which are already known and which may be used instead of, or in addition to, features described herein. Features that are described in the context of separate aspects or embodiments may be provided in combination in a single aspect or embodiment. Conversely, features which are described in the context of a single aspect or embodiment may also be provided separately or in any suitable sub-combination.

LIST OF REFERENCE NUMERALS 100, 200, 300, 400, 900, 1000, 1100, 1200, 1300 Valve assembly
101, 201a, 301, 401, 901, 1001, 1101, 1201, 1301 First or side fluid port
102, 202, 302, 402, 902, 1002, 1102, 1202, 1302 Second or end fluid port
201b Third fluid port
103, 203, 303, 403, 903, 1003, 1103, 1203, 1303 Valve seat
104, 204, 304, 404, 904, 1004, 1104, 1204, 1304 Inner valve seat
105, 205, 305, 405, 905, 1005, 1105, 1205, 1305 Outer valve seat
106, 206, 306, 406, 906, 1006, 1106, 1206, 1306 Valve seal
107, 207, 307, 407, 907, 1007, 1107, 1207, 1307 Moveable plunger
108, 208, 308, 408 Moveable plunger body
908, 1008, 1108, Interface
109, 209, 309, 409 Opening
909, 1009, 1109, 1308 Valve body
110, 210, 310, 410 Spring
111 Non-moveable insulating membrane
311, 411 Moveable diaphragm
312 Pressure equalising fluid pathway
313a, 413a Upper shim
313b, 413b Lower shim
314, 414 Valve chamber
315, 415 Pressure compensating chamber
124, 924, 1024, 1124, 1224, 1324 Inner valve member
125, 925, 1025, 1125, 1225, 1325 Outer valve member
926, 1026, 1126, 1226, 1326 Radial alignment means
127, 927, 1027, 1127, 1227, 1327 Axial alignment means
928, 1028, 1128, 1228, 1328 Annular flow channel
129, 929, 1029, 1129, 1229, 1329 Axis
1030, 1130 Barrier
1031, 1032 Leg
1033, 1034 Inner surface
1135 Lateral fluid flow passage
1137 Projection
140 Axially abutting surface
150, 1250, 151 Interface
160, 1260 Projection
170 Inner surface of the bore

The invention claimed is:

1. A valve assembly, comprising:
a valve seat comprising an inner concentric valve seat and an outer concentric valve seat, the inner concentric valve seat being arranged radially inward of the outer concentric valve seat to provide an annular opening therebetween;
a moveable plunger, being moveable between a closed position and an open position to simultaneously vary a flow restriction at the inner and outer concentric valve seats, and arranged to simultaneously open and close the inner concentric valve seat and the outer concentric valve seat when moving between the closed position and the open position;
an inner valve member comprising the inner concentric valve seat;
an outer valve member comprising the outer concentric valve seat;
wherein the inner valve member is a separate component from the outer valve member and is mounted in fixed relation to the outer valve member via mounting means, the mounting means comprising:
radial alignment means configured to maintain concentricity of the inner concentric valve seat relative to the outer concentric valve seat; and
axial alignment means configured to maintain axial alignment of the inner concentric valve seat relative to the outer concentric valve seat along an axis, the axis being substantially orthogonal to a plane of the concentric valve seats.

2. A valve assembly according to claim 1, wherein the radial alignment means comprises at least one radially facing abutting face, provided on at least one of the inner valve member and the outer valve member.

3. A valve assembly according to claim 2, wherein the at least one radially facing abutting face forms an interference fit with an opposing face of the valve assembly.

4. A valve assembly according to claim 1, wherein the radial alignment means comprises at least one radially facing abutting face, provided on the inner valve member and at least one radially-facing abutting face provided on the outer valve member.

5. A valve assembly according to claim 4, wherein the at least one radially facing abutting faces provided on the inner valve member abuts the at least one radially facing abutting faces is provided on the outer valve member.

6. A valve assembly according to claim 4, wherein the outer valve member comprises a bore, the bore having an first diameter in a first portion of the bore, and an area of reduced inner diameter in a second portion of the bore, and wherein the at least one of the radially facing abutting faces is provided on the area of reduced inner diameter.

7. A valve assembly according to claim 1, wherein the axial alignment means comprises a mechanical fixation between at least one radially facing abutting face provided on at least one of the inner and outer valve members, and an opposing radially abutting face of the assembly.

8. A valve assembly according to claim 7, wherein the mechanical fixation comprises an interference fit.

9. A valve assembly according to claim 1, further comprising a first fluid port and a second fluid port, wherein the axial alignment means provides a fluid seal, fluidly isolating the second fluid port from the first fluid port when the valve is in the closed position.

10. A valve assembly according to claim 9, wherein the first fluid port is provided between the concentric valve seats and the alignment means.

11. A valve assembly according to claim 10, wherein the second fluid port of claim 9 is in fluid communication with the annular flow channel when the valve is in the closed position.

12. A valve assembly according to claim 10, wherein the second fluid port of claim 9 is in fluid communication with an inner edge of the inner concentric valve seat and an outer edge of the outer concentric valve seat when the valve is in the closed position.

13. A valve assembly according to claim 1, wherein an axially extending annular flow channel is formed between at least a portion of the inner valve member and the outer valve member.

14. A valve assembly according to claim 1, further comprising a valve body member within which at least one of the inner and outer valve members is mounted, wherein the radial alignment means comprises a radially outer surface of the outer valve member being in contact with a radially inner surface of the valve body member.

15. A valve assembly according to claim 1, further comprising a valve body member within which at least one of the inner and outer valve members is mounted, wherein the radial alignment means comprises a radially outer surface of the inner valve member being in contact with a radially inner surface of the valve body member.

16. A valve assembly according to claim 15, wherein the supplementary axial alignment means comprises a radial projection.

17. A valve assembly according to claim 1, further comprising supplementary radial alignment means, axially spaced from the radial alignment means.

18. A method of assembling a valve sub-assembly, comprising the steps of:
providing an inner valve member comprising an inner concentric valve seat;
providing an outer valve member comprising an outer concentric valve seat;
arranging the inner valve member so as to position the inner concentric valve seat radially inward of the outer concentric valve seat to provide an annular flow opening therebetween;
radially aligning the inner concentric valve seat relative to the outer concentric valve seat to maintain concentricity thereof;
axially aligning the inner concentric valve seat relative to the outer concentric valve seat along an axis, the axis being substantially orthogonal to a plane of the concentric valve seats;
providing a radial alignment means of the assembly, to maintain concentricity of the inner concentric valve seat relative to the outer concentric valve seat;
providing an axial alignment means of the assembly, to maintain axial alignment of the inner concentric valve seat relative to the outer concentric valve seat along an axis;
such that the inner valve member is a separate component from the outer valve member and is mounted in fixed relation to the outer valve member via mounting means, comprising the axial and radial alignment means;
providing a moveable plunger, being moveable between a closed position and an open position to vary a flow restriction at the valve seat, and arranged to simultaneously open and close the inner concentric valve seat and the outer concentric valve seat when moving between the closed position and the open position; and
aligning the moveable plunger relative to the concentric valve seats such that the moveable plunger simultaneously seals the inner concentric valve seat and the outer concentric valve seat when in the closed position.

19. A method according to claim 18, wherein the step of axially aligning the inner concentric valve seat relative to the outer concentric valve seat comprises providing a support member configured to support the inner and outer valve seats in a desired axial alignment, providing a first of the inner and outer valve members on the support, and axially aligning the second of the inner and outer valve members relative to the first by positioning both of the inner and outer valve seats on the support.

20. A method according to claim 19, wherein the support comprises a planar surface and axially aligning the inner and outer valve members comprises positioning both of the inner and outer valve seats on the planar surface.

21. A method according to claim 18, further comprising axially pressing the first of the inner and outer valve members into position relative to the second of the inner and outer valve members to create an interference fit which maintains the relative axial alignment of the inner and outer valve seats.

22. A method according to claim 18, further comprising axially pressing the first of the inner and outer valve members into engagement with the second of the inner and outer valve members, to provide an interference fit which maintains the relative axial alignment of the inner and outer valve seats.

\* \* \* \* \*